US010362279B2

United States Patent
Jeong et al.

(10) Patent No.: US 10,362,279 B2
(45) Date of Patent: Jul. 23, 2019

(54) IMAGE CAPTURING DEVICE

(71) Applicant: SAMSUNG ELECTRONICS CO., LTD., Suwon-si, Gyeonggi-Do (KR)

(72) Inventors: Seongyeong Jeong, Suwon-si (KR); Kyu-Min Kyung, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 251 days.

(21) Appl. No.: 15/225,089

(22) Filed: Aug. 1, 2016

(65) Prior Publication Data
US 2017/0085849 A1    Mar. 23, 2017

(30) Foreign Application Priority Data
Sep. 22, 2015    (KR) .................. 10-2015-0134070

(51) Int. Cl.
*H04N 9/04* (2006.01)
*H04N 5/365* (2011.01)
*H04N 5/378* (2011.01)

(52) U.S. Cl.
CPC .............. *H04N 9/045* (2013.01); *H04N 5/365* (2013.01); *H04N 5/3653* (2013.01); *H04N 5/378* (2013.01)

(58) Field of Classification Search
CPC ........ H04N 9/045; H04N 5/365; H04N 5/359; H04N 5/3696
See application file for complete search history.

(56) References Cited

U.S. PATENT DOCUMENTS

| | | | |
|---|---|---|---|
| 4,754,323 A | 6/1988 | Kaji et al. | |
| 5,457,477 A | 10/1995 | Wang et al. | |
| 7,742,088 B2 | 6/2010 | Shizukuishi | |
| 8,125,543 B2 | 2/2012 | Cho | |
| 8,363,932 B2 | 1/2013 | Lee et al. | |
| 8,493,573 B2 | 7/2013 | Chinn et al. | |
| 8,532,373 B2 | 9/2013 | Hong | |
| 8,638,342 B2 | 1/2014 | Cote et al. | |
| 8,878,959 B2 * | 11/2014 | Mabuchi | H01L 27/14621 348/230.1 |
| 8,988,595 B2 | 3/2015 | Kunieda et al. | |
| 2005/0225655 A1 | 10/2005 | Suzuki | |
| 2007/0030365 A1 * | 2/2007 | Jerdev | H04N 5/367 348/241 |
| 2009/0015693 A1 | 1/2009 | Wada | |

(Continued)

FOREIGN PATENT DOCUMENTS

JP    2009033737    2/2009
WO    2014017153    1/2014

*Primary Examiner* — Sinh Tran
*Assistant Examiner* — Zhenzhen Wu
(74) *Attorney, Agent, or Firm* — F. Chau & Associates, LLC

(57) ABSTRACT

An image capturing device includes a pixel array having a plurality of pixels arranged in a matrix form, wherein each of the pixels includes a pair of photoelectric conversion devices, an analog to digital converter that converts a pair of pixel signals corresponding to charges accumulated in the pair of photoelectric conversion devices included in each of the pixels into a pair of digital signals, and a circuit receiving the pair of digital signals being output from each of the pixels, detecting a pixel including a photoelectric conversion device outputting a saturation current based on the received pairs in the detected pixel to output a correction signal.

15 Claims, 16 Drawing Sheets

(56) References Cited

U.S. PATENT DOCUMENTS

| | | | |
|---|---|---|---|
| 2011/0019035 A1* | 1/2011 | Satodate | H04N 5/357 348/241 |
| 2011/0317916 A1 | 12/2011 | Zhang et al. | |
| 2013/0235276 A1* | 9/2013 | Ogawa | H04N 5/23212 348/703 |
| 2014/0043523 A1* | 2/2014 | Yamazaki | H04N 5/23212 348/352 |
| 2014/0285627 A1* | 9/2014 | Kuboi | H04N 5/2353 348/46 |
| 2015/0206280 A1 | 7/2015 | Ono et al. | |
| 2016/0309102 A1* | 10/2016 | Koizumi | H04N 5/3696 |

* cited by examiner

US 10,362,279 B2

IMAGE CAPTURING DEVICE

CROSS-REFERENCE TO RELATED APPLICATIONS

This U.S. non-provisional patent application claims priority under 35 U.S.C. § 119 to Korean Patent Application No. 10-2015-0134070, filed on Sep. 22, 2015, the disclosure of which is incorporated by reference herein.

BACKGROUND

1. Technical Field

The inventive concept relates to an image technology, and more particularly, to an image capturing device for canceling a false color.

2. Discussion of Related Art

An image sensor is used to generate image information. Pixels of the image sensor are provided with light and generate currents having different intensities according to an intensity of the received light. A circuit may be used to convert the currents into a digital signal for each pixel. A digital value of each digital signal is different depending on an intensity of the corresponding generated current. Image information may be generated based on the digital signals.

A charge coupled device (CCD) and a complementary metal oxide silicon (CMOS) image sensor are generally used as an image sensor. A CMOS image sensor can be miniaturized fairly easily. Power consumption of a CMOS image sensor is also very low and accordingly can be applied to a device having a limited battery capacity. A CMOS image sensor may be less costly to manufacture as compared to a CCD.

SUMMARY

At least one embodiment of the inventive concept provides an image capturing device and a method of operating the image capturing device.

According to an exemplary embodiment of the inventive concept, an image capturing device includes a pixel array having a plurality of pixels arranged in a matrix form, an analog to digital converter, and a circuit. Each of the pixels includes a pair of photoelectric conversion devices. The analog to digital converter converts a pair of pixel signals corresponding to charges accumulated in the pair of photoelectric conversion devices included in each of the pixels into a pair of digital signals. The circuit receives the pair of digital signals output from each of the pixels, detects a pixel including a photoelectric conversion device outputting a saturation current based on the received pairs, and corrects the digital signal corresponding to the photoelectric conversion device outputting a saturation current included in the detected pixel to output a correction signal.

According to an exemplary embodiment of the inventive concept, an image capturing method of an image capturing device includes: detecting a pixel through which a saturation current flows from a pair of digital signals output from a pair of photoelectric conversion devices disposed in each of a plurality of pixels; determining a ratio of digital signals output from a pair of photoelectric conversion devices disposed in adjacent pixels of a first group of the pixels to which the detected pixel belongs; performing a first correction using a digital signal of a photoelectric conversion device disposed within the detected pixel that that is part of the pair comprising a photoelectric conversion device outputting the saturation current when a similarity of the ratios is greater than a certain value; and compensating a digital signal of the saturation current of the detected pixel using the first correction.

According to an exemplary embodiment of the inventive concept, a device for managing an image capturing device including a plurality of pixels includes: an analog to digital converter that converts a first pixel signal from a first photoelectric conversion device of a first pixel among the devices to a first digital signal and a second pixel signal from a second photoelectric conversion device of the first pixel to a second digital signal; and a circuit configured to determine whether one of the digital signals indicates that one of the photoelectric conversion devices is saturated with light and the other of the digital signals indicates that the other of the photoelectric conversion devices is not saturated with light, and correct the digital signal that indicates the one photoelectric conversion device is saturated.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Figure 1:
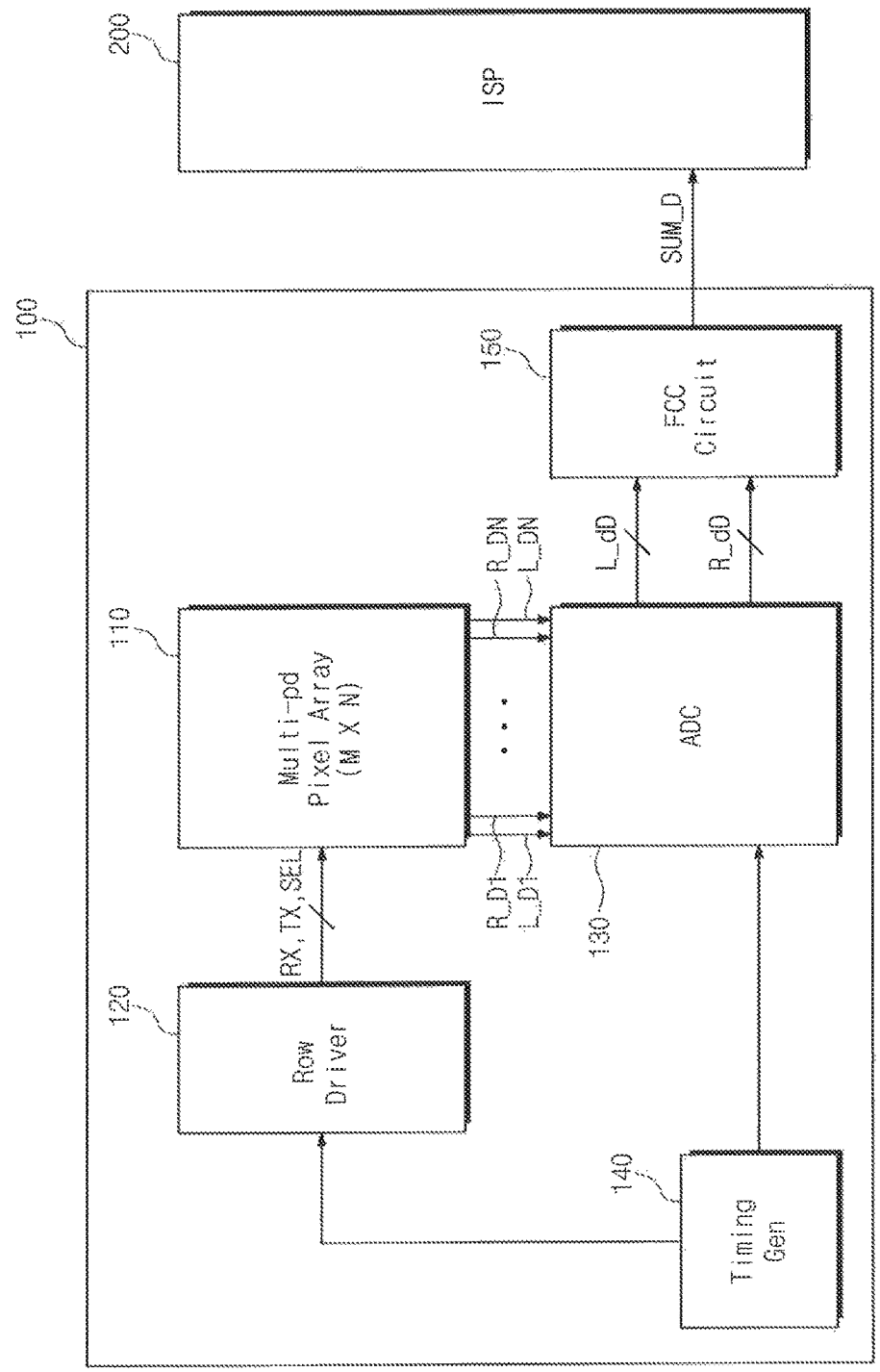
FIG. 1 is a block diagram of an image capturing device in accordance with an exemplary embodiment of the inventive concept.

Embodiments of inventive concept will be described more fully hereinafter with reference to the accompanying drawings, in which exemplary embodiments of the invention are shown. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout. It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

FIG. 1 is a block diagram of an image capturing device 100 in accordance with an exemplary embodiment of the inventive concept.

Referring to FIG. 1, the image capturing device 100 includes a multi pixel array 110, a row driver 120, an analog to digital converter 130, a timing generator 140 and a false color cancelation circuit 150.

The multi pixel array 110 includes a plurality of unit pixels. For example, the unit pixels of the multi pixel array 110 may be arranged in a matrix form having M number of rows and N number of columns, where M and N are typically integers greater than 1.

Each of the unit pixels may include a color filter to pass specific wavelength of a light. For example, the color filter may be at least one of a red filter that passes wavelengths of red light, a green filter that passes wavelengths of green light, or a blue filter that passes wavelengths of a blue light. As another example, the color filter may be at least one of a cyan filter, a yellow filter and a magenta filter.

Each of the unit pixels may include a pair of photoelectric conversion devices. Thus, each of the unit pixels can output a pair of pixel signals ((L_D1, R_D1); ( . . . , . . . ); (L_DN, R_DN)) corresponding to wavelengths of a light to the analog to digital converter 130.

For example, the pair of photoelectric conversion devices may be a pair of photo diodes. For example, the photo diode may be a PIN photo diode having a structure in which an intrinsic semiconductor layer is inserted in a PN junction. The PIN photo diode may be a diode with a wide, un-doped intrinsic semiconductor region located between a p-type semiconductor and an n-type semiconductor region. The photo diode may be an avalanche photodiode (APD) having a structure in which an avalanche layer exists in a PN junction. The APD may be a high sensitivity photodiode that operates at high speeds and high gain by applying a reverse bias.

A detailed arrangement structure of a multi pixel array 110 will be described with reference to FIG. 3.

The row driver 120 may provide multiple driving signals (RX, TX, SEL) to the multi pixel array 110 for driving multiple unit pixels according to a result decoded in a row decoder (not illustrated). For example, in a case where the unit pixels are arranged in a matrix form, the driving signals (RX, TX, SEL) may be provided by each row.

The analog to digital converter 130 can convert a pair of pixel signals ((L_D1, R_D1); ( . . . , . . . ); (L_DN, R_DN)) corresponding to charges accumulated in a pair of photoelectric conversion devices included in each of the unit pixels into a pair of digital signals. The analog to digital converter 130 can compare a pair of pixel signals ((L_D1, R_D1); ( . . . , . . . ); L_DN, R_DN)) output from the multi pixel array 110 respectively on the basis of a ramp signal generated from a ramp signal generator (not illustrated). The analog to digital converter 130 counts comparison outputs obtained according to a comparison result as a clock signal and can store the counted value in an internal buffer (not illustrated) of the analog to digital converter 130. That is, a pair of counted values obtained according to a comparison result of the analog to digital converter 130 may correspond to a pair of digital data ((L_dD1, R_dD1); ( . . . , . . . ); (L_dDN, R_dDN)) corresponding to the pair of pixel signals ((L_D1, R_D1); ( . . . , . . . ); (L_DN, R_DN)).

The analog to digital converter 130 can also output a pair of digital data ((L_dD1, R_dD1); ( . . . , . . . ); (L_dDN, R_dDN) in a first and second line data (L_dD, R_dD) form according to an output signal of the timing generator 140 (e.g., a timing controller or timing circuit). For example, the first line data L_dD may include output signals (L_D1, . . . , L_DN) of first photoelectric conversion devices of each of the unit pixels. For example, the second line data R_dD may include output signals (R_D1, . . . , R_DN) of second photoelectric conversion devices of each of the unit pixels.

The timing generator 140 generates a timing signal in response to a control signal for a timing generation. For example, the row driver 120 and the analog to digital converter 130 may be driven in response to the timing signal.

The false color cancelation circuit 150 can output a correction signal SUM_D to an image signal processor 200 on the basis of the first and second line data (L_dD, R_dD) to prevent the occurrence of a false color. The cause of the false color occurrence will be described in detail with reference to FIG. 4. An operation of the false color cancelation circuit 150 will be described in detail with reference to FIGS. 7 and 8.

Figure 2:
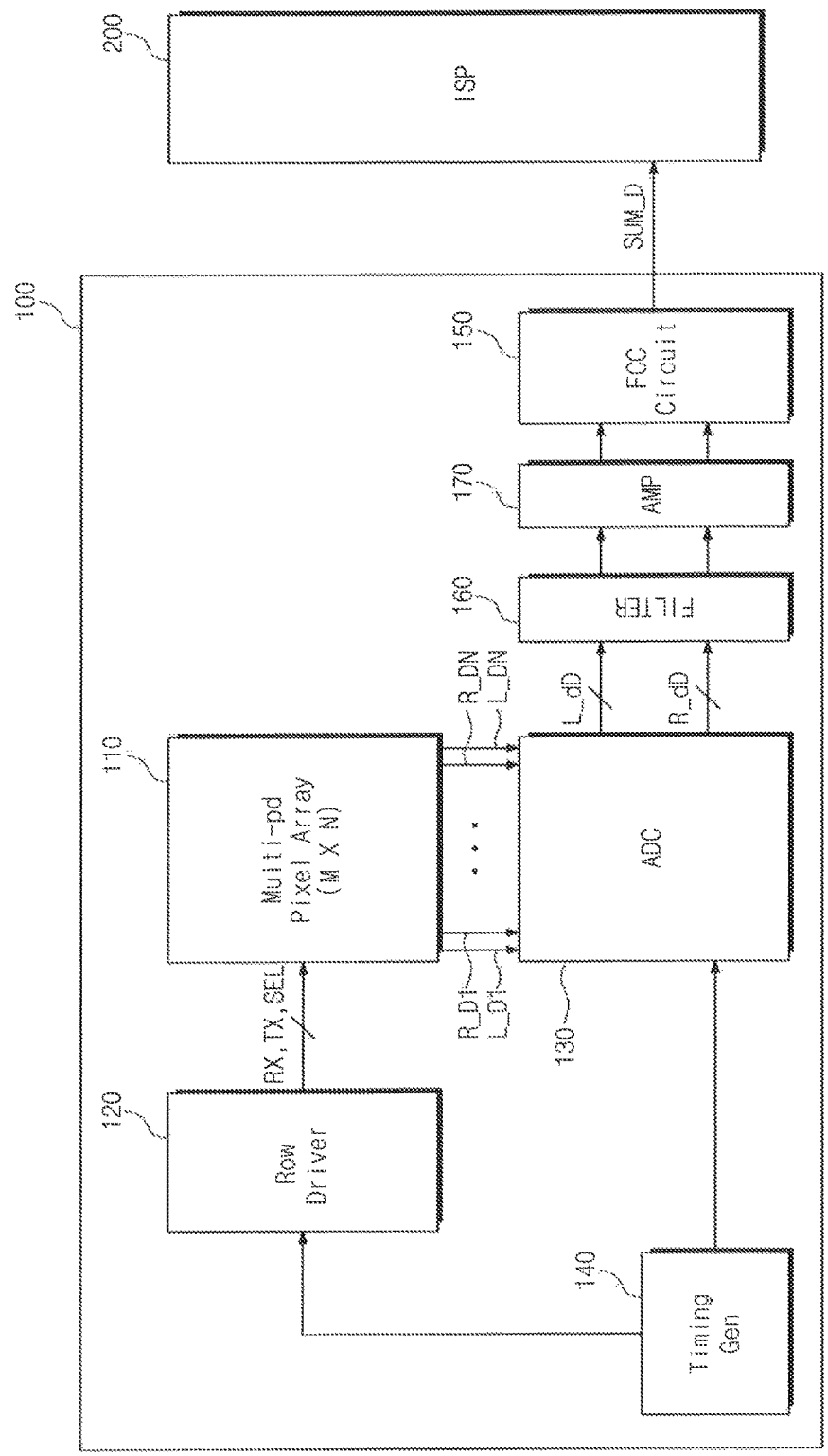
FIG. 2 is a block diagram of a more detailed image capturing device in accordance with an exemplary embodiment of the inventive concept.

FIG. 2 is a block diagram of a more detailed image capturing device 100 in accordance with an exemplary embodiment of the inventive concept.

Referring to FIG. 2, a filter circuit 160 can cancel a noise that may be included in a pair of digital data ((L_dD1, R_dD1); ( . . . , . . . ); (L_dDN, R_dDN)). A noise included in the pair of digital data ((L_dD1, R_dD1; ( . . . , . . . ); (L_dDN, R_dDN)) may occur in the process of an analog to digital conversion. In an embodiment, the filter circuit 160 is a low-pass filter, a high pass filter, a Wiener filter, a Kalman filter, or a Savitzky-Golay smoothing filter.

An amplifying circuit 170 receives a pair of digital data ((L_dD1, R_dD1); ( . . . , . . . ); (L_dDN, R_dDN)) of which a noise is canceled to adjust a voltage gain of signals which become different depending on a wavelength of a light when the light passes through a lens to a certain voltage level. In an embodiment, the amplifying circuit 170 is an amplifier such as an operational amplifier or a differential amplifier.

For brevity of description, a description of constituent elements of FIG. 2 that were already described in FIG. 1 is omitted.

Figure 3:
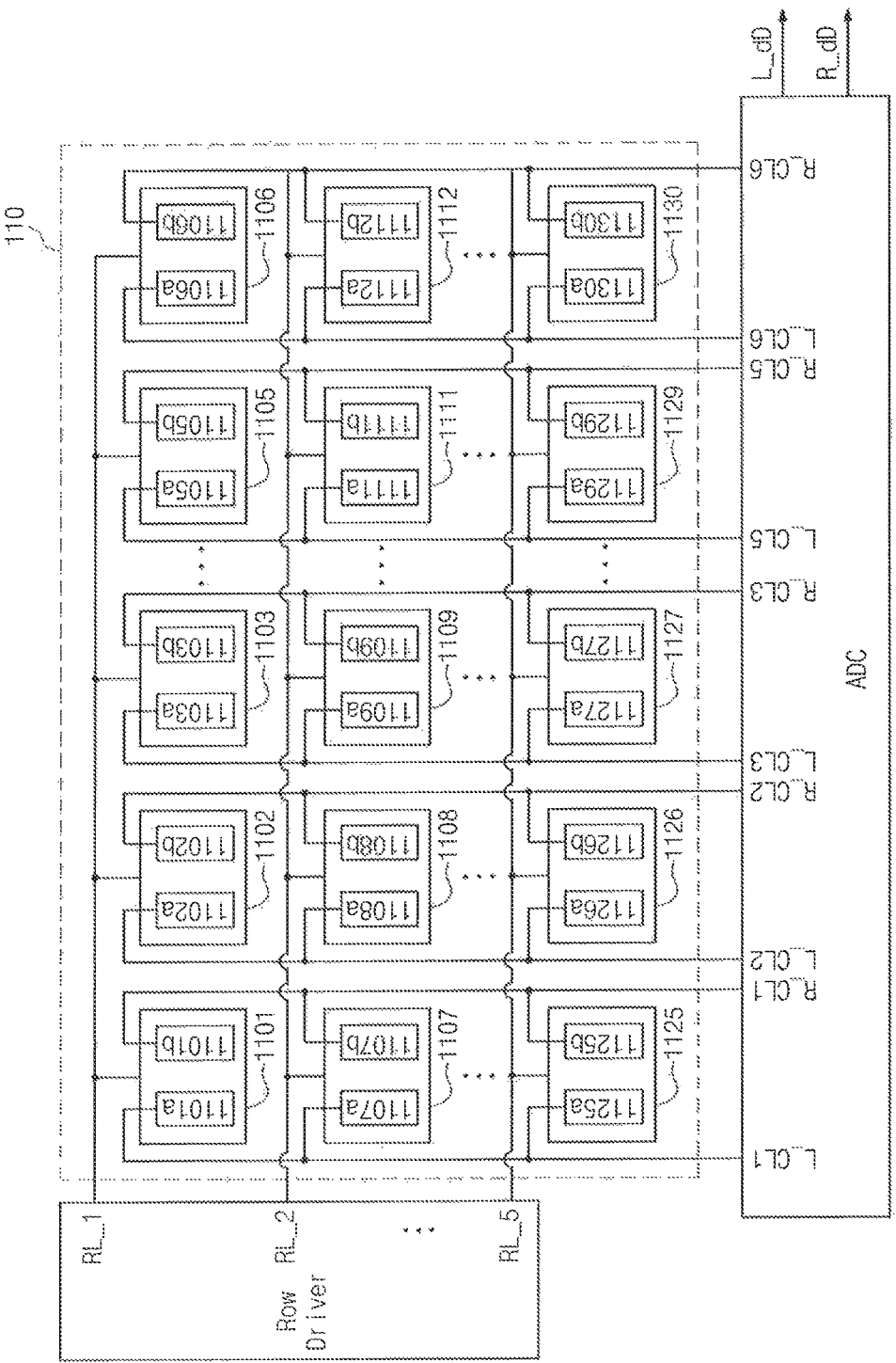
FIG. 3 illustrates a detailed arrangement structure of a multi pixel array in accordance with an exemplary embodiment of the inventive concept.

FIG. 3 illustrates the structure of a multi pixel array 110 in accordance with an exemplary embodiment of the inventive concept.

The multi pixel array 110 of FIG. 3 may include a first unit pixel 1101 through thirtieth unit pixel 1130. That is, the plurality of unit pixels (1101-1130) may be arranged in a matrix form having five rows (RL_1~RL_5) connected to the row driver 120 and six pairs of columns (L_CL1, R_CL1~L_CL6,R_CL6) connected to the analog to digital converter (ADC) 130.

Each of the unit pixels of the multi pixel array 110 may include a pair of photoelectric conversion devices. For example, the pair of photoelectric conversion devices may be a pair of photo diodes.

For example, the first unit pixel 1101 may include a first type photo diode 1101a and a second type photo diode 1101b. Similarly, the thirtieth unit pixel 1130 may include a first type photo diode 1130a and a second type photo diode 1130b.

Pixel signals corresponding to charges accumulated in the first type photo diode 1101a of the first unit pixel 1101, the first type photo diode 1107a of the seventh unit pixel 1107, the first type photo diode 1113a of the thirteenth unit pixel 1113, the first type photo diode 1119a of the nineteenth unit pixel 1119 and the first type photo diode 1125a of the twenty-fifth unit pixel 1125 may be output through the first type line L_CL1 of the first column. Also, pixel signals corresponding to charges accumulated in the second type photo diode 1101b of the first unit pixel 1101, the second type photo diode 1107b of the seventh unit pixel 1107, the second type photo diode 1113b of the thirteenth unit pixel 1113, the second type photo diode 1119b of the nineteenth unit pixel 1119 and the second type photo diode 1125b of the twenty-fifth unit pixel 1125 may be output through the second type line R_CL1 of the first column.

Similarly, pixel signals corresponding to charges accumulated in the first type photo diode 1106a of the sixth unit pixel 1106, the first type photo diode 1112a of the twelfth unit pixel 1112, the first type photo diode 1118a of the eighteenth unit pixel 1118, the first type photo diode 1124a of the twenty-fourth unit pixel 1124 and the first type photo diode 1130a of the thirtieth unit pixel 1130 may be output through the first type line L_CL6 of the sixth column. Also, pixel signals corresponding to charges accumulated in the second type photo diode 1106b of the sixth unit pixel 1106, the second type photo diode 1112b of the twelfth unit pixel 1112, the second type photo diode 1118b of the eighteenth unit pixel 1118, the second type photo diode 1124b of the twenty-fourth unit pixel 1124 and the second type photo diode 1130b of the thirtieth unit pixel 1130 may be output through the second type line R_CL6 of the sixth column.

Figure 4:
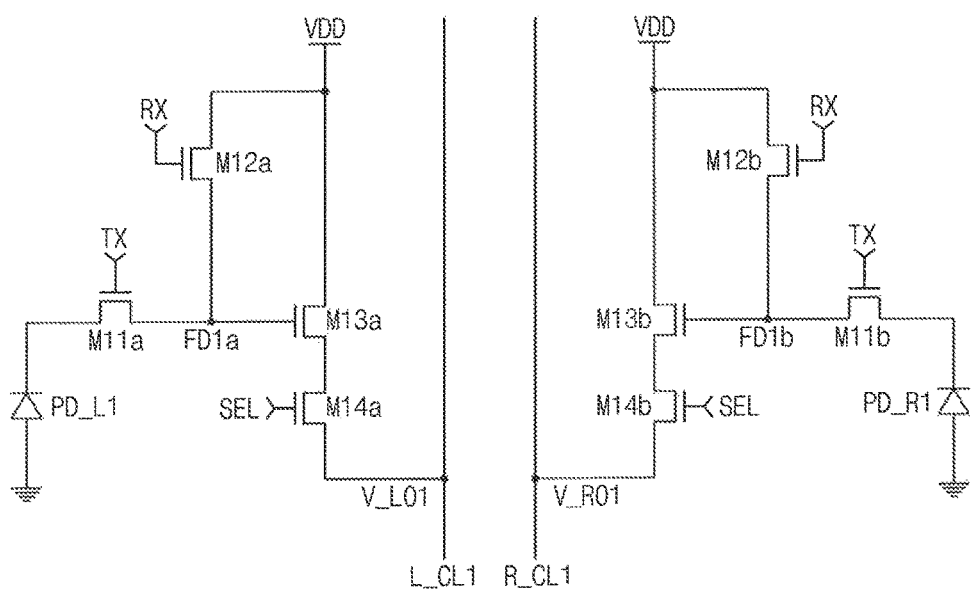
FIG. 4 illustrates an illustrative detailed circuit diagram of a unit pixel of a multi pixel array of FIG. 2.

FIG. 4 illustrates an illustrative detailed circuit diagram of a unit pixel of a multi pixel array of FIG. 3 according to an exemplary embodiment of the inventive concept.

Referring to FIGS. 1 through 4, it is assumed that a unit pixel illustrated in FIG. 4 is a detailed circuit diagram of the first unit pixel 1101. A unit pixel of the image capturing device 100 may be implemented by a photoelectric conversion unit like a pair of photo diodes (PD_L1, PD_R1), and four pairs of transistors including a pair of transmission transistors (M11a, M11b), a pair of reset transistors (M12a, M12b), a pair of source follower transistors (M13a, M13b) and a pair of select transistors (M14a, M14b). Gate voltages RX are applied to gate terminals of the reset transistors, gate voltages TX are applied to gate terminals of the transmission transistors, and gate voltages SEL are applied to gate terminals of the select transistors. In an embodiment, terminals of the photodiodes receive a ground voltage and non-gate terminals of the reset transistors receive a power supply voltage VDD that is higher than the ground voltage. Although a structure of the four pairs of transistors is illustrated in FIG. 4, the unit pixel of the image capturing device 100 may have a structure of a three pairs of transistors, a structure of a five pairs of transistors or a structure in which a plurality of pixels shares some transistors.

In FIG. 4, if gate voltages RX of the pair of reset transistors (M12a, M12b) increase and thereby the reset transistors (M12a, M12b) are turned on, electric potentials of floating diffusion nodes (FD1a, FD1b) which are sensing nodes are reset to a power supply voltage VDD. For example, if the gate voltages RX increase from a first level to a second higher level, the reset transistors are turned on. If light received from the outside during a light integration period enters the photo diodes (PD_L1, PD_R1), an electron hole pair (EHP) is generated in proportion to the light that entered the photo diodes (PD_L1, PD_R1).

After the light integration period has finished, if the gate voltages TX of the transmission transistors (M11a, M11b) increase (e.g., from a third level to a fourth higher level), charges accumulated in regions of the photo diodes (PD_L1, PD_R1) are transmitted to the floating diffusion nodes (FD1a, FD1b) and if electric potentials of the floating diffusion nodes (FD1a, FD1b) decrease in proportion to the quantity of transmitted signal charges, source potentials of the source follower transistors (M13a, M13b) are changed.

As gate voltages SEL of the select transistors (M14a, M14b) increase (e.g., from a fifth level to a sixth higher level), the select transistors (M14a, M14b) are turned on. Accordingly, source potentials (V_LO1, V_RO1) of the source follower transistors (M13a, M13b) may be output through the first type line L_CL1 and the second type line R_CL1, respectively. Herein, a structure of the first unit pixel 1101 may have the same structure as the remaining unit pixels of the multi pixel array 110.

The photo diode (PD_L1, PD_R1) is used as a photoelectric conversion unit in FIG. 4 but the inventive concept is not limited thereto. At least one of a photo transistor, a photo gate, a pinned photo diode and combinations thereof may be used as the photoelectric conversion unit.

A photoelectric conversion unit included in the unit pixel may include not only two photoelectric conversion units such as illustrated in FIG. 4 but also three or four photoelectric conversion units in alternate embodiments.

Figure 5:
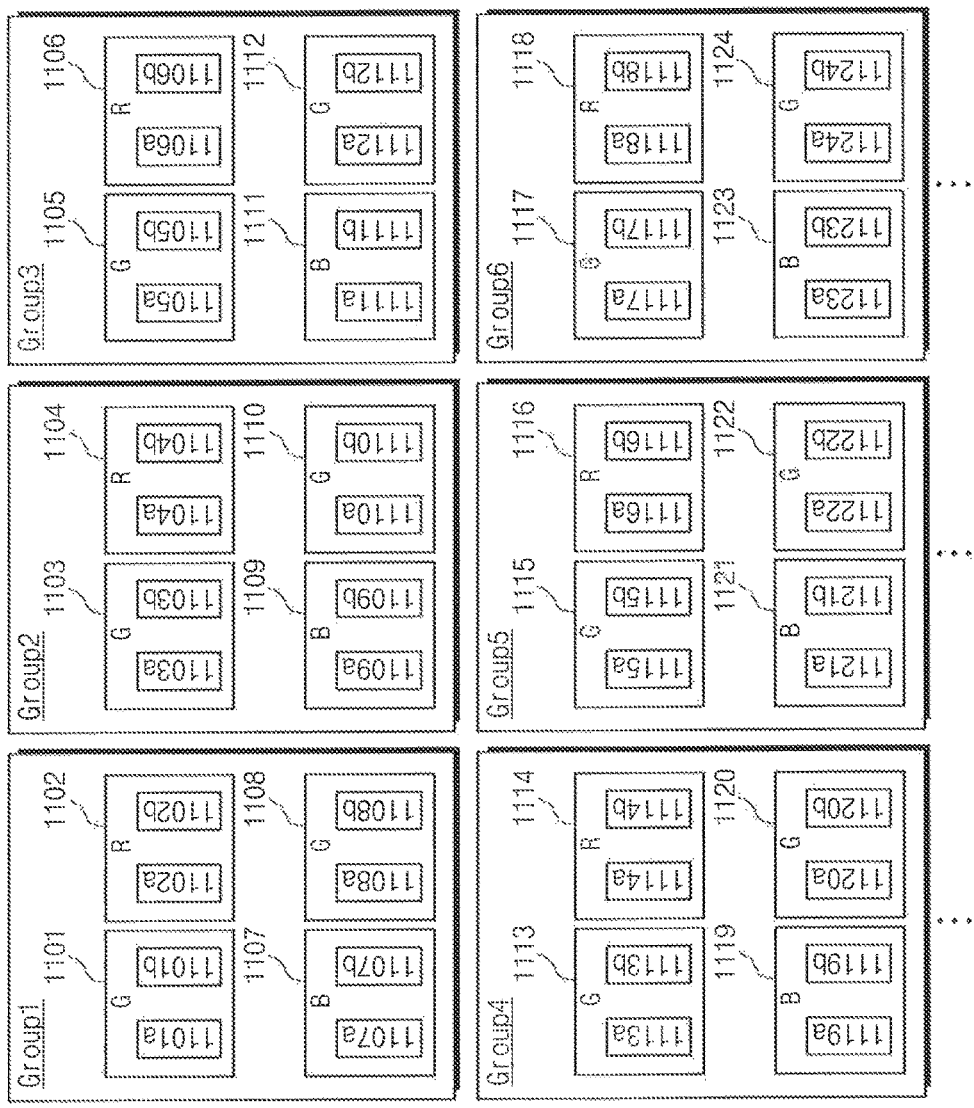
FIG. 5 illustrates a conceptual diagram in which unit pixels of a multi pixel array in accordance with an exemplary embodiment of the inventive concept are arranged according to a Bayer pattern.

FIG. 5 illustrates a conceptual diagram in which unit pixels of a multi pixel array 110 in accordance with an exemplary embodiment of the inventive concept are arranged according to a Bayer pattern.

Referring to FIGS. 1 through 5, it is assumed that FIG. 5 illustrates the first through twenty-fourth unit pixels (1101~1124) which are parts of the unit pixels of FIG. 3. It is also assumed that each unit pixel includes a first type photo diode and a second type photo diode. For example, the first unit pixel 1101 includes the first type photo diode 1101a and the second type photo diode 1101b. Similarly, the twenty-fourth unit pixel 1124 includes the first type photo diode 1124a and the second type photo diode 1124b.

In the unit pixels of FIG. 5, two green pixels G, one red pixel R and one blue pixel B constitute a basic group. FIG. 5 illustrates six basic groups (Group1~Group6).

For example, the first group (Group 1) may include the first unit pixel 1101 combined with a green filter, the second unit pixel 1102 combined with a red filter, the seventh unit pixel 1107 combined with a blue filter and the eighth unit pixel 1108 combined with a green filter.

For example, the second group (Group 2) may include the third unit pixel 1103 combined with a green filter, the fourth unit pixel 1104 combined with a red filter, the ninth unit pixel 1109 combined with a blue filter and the tenth unit pixel 1110 combined with a green filter.

For example, the third group (Group 3) may include the fifth unit pixel 1105 combined with a green filter, the sixth unit pixel 1106 combined with a red filter, the eleventh unit pixel 1111 combined with a blue filter and the twelfth unit pixel 1112 combined with a green filter.

For example, the fourth group (Group 4) may include the thirteenth unit pixel 1113 combined with a green filter, the fourteenth unit pixel 1114 combined with a red filter, the nineteenth unit pixel 1119 combined with a blue filter and the twentieth unit pixel 1120 combined with a green filter.

For example, the fifth group (Group 5) may include the fifteenth unit pixel 1115 combined with a green filter, the sixteenth unit pixel 1116 combined with a red filter, the twenty-first unit pixel 1121 combined with a blue filter and the twenty second unit pixel 1122 combined with a green filter.

For example, the sixth group (Group 6) may include the seventh unit pixel 1117 combined with a green filter, the eighteenth unit pixel 1118 combined with a red filter, the twenty-third unit pixel 1123 combined with a blue filter and the twenty fourth unit pixel 1124 combined with a green filter.

Figure 6:
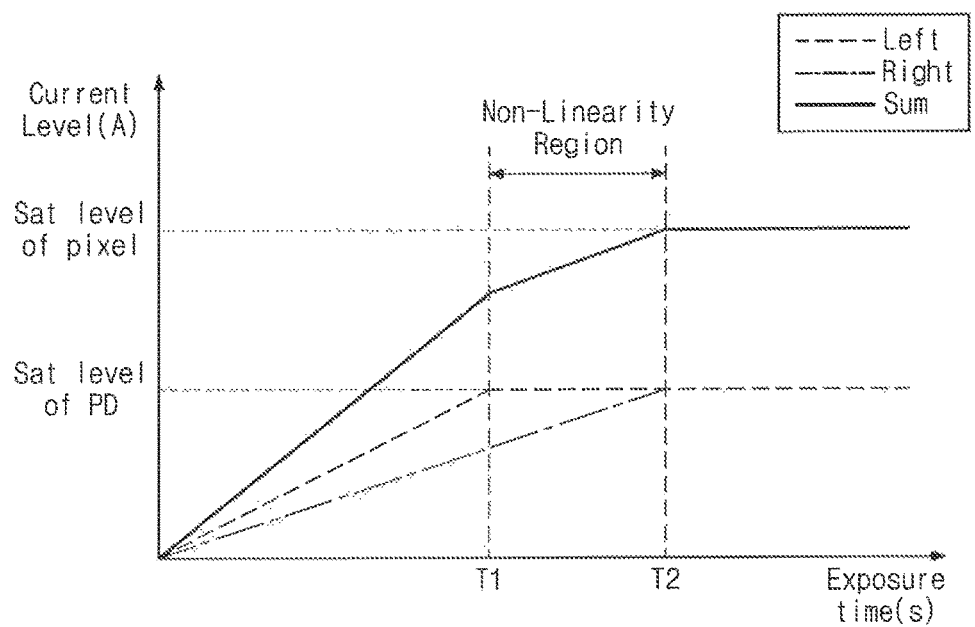
FIG. 6 illustrates a conceptual diagram of nonlinearity that occurs according to a difference of light received by a first type photo diode and a second type photo diode included in a unit pixel.

FIG. 6 illustrates a conceptual diagram of nonlinearity that occurs according to a difference of light received by a first type photo diode and a second type photo diode included in a unit pixel.

The horizontal axis of FIG. 6 is time (e.g., an exposure time) where a first type photo diode and a second type photo diode included in a unit pixel are exposed to a light. The vertical axis of FIG. 6 is an output value (A, Ampere) of the first type photo diode and the second type photo diode included in the unit pixel. For example, the vertical axis may represent an amount of current that is output by the photo diodes when they are exposed to light.

Referring to FIGS. 1, 4 and 6, the unit pixels may include a pair of photo diodes. For example, in a case where an image is out of focus depending on a location of a camera lens, a difference may occur in the amount of light that reaches a first type photo diode and a second type photo diode included in each unit pixel of the multi pixel array 110.

It is assumed that FIG. 6 illustrates a graph (Left) of the first type photo diode and a graph (Right) of the second type photo diode that are included in any one unit pixel among the unit pixels of the multi pixel array 110. In this case, since an amount of light received by the first type photo diode is larger than the amount of light received by the second type photo diode, a saturation time (T1) of the first type photo diode is shorter than a saturation time (T2) of the second type photo diode. For example, the first type photo diode becomes saturated before the second type photo diode becomes saturated. Thereafter, a pixel signal output from the first type photo diode and a pixel signal output from the second type photo diode are summed together to generate a final signal. In this case, a graph (Sum) of the final signal has a region (T1~T2) in which a nonlinearity characteristic exists. A false color may occur if demosaicing and a white balance are performed using the final signal having the nonlinearity region as illustrated in FIG. 6.

Figure 7:
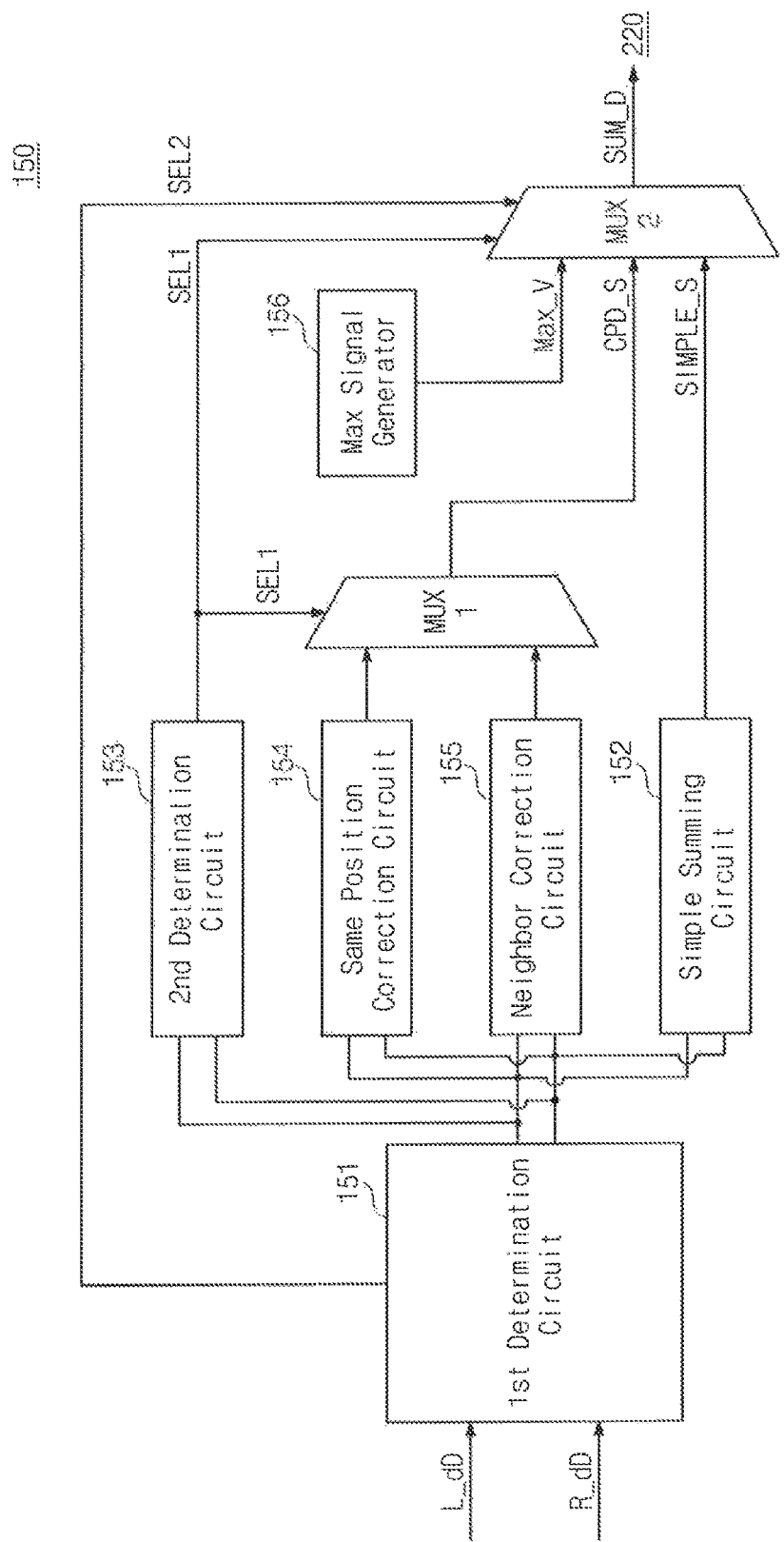
FIG. 7 illustrates an internal block diagram of a false color cancelation circuit in accordance with an exemplary embodiment of the inventive concept.

FIG. 7 illustrates an internal block diagram of a false color cancelation circuit in accordance with an exemplary embodiment of the inventive concept.

Referring to FIGS. 1, 3, 5 and 7, the false color cancelation circuit 150 includes a first determination circuit 151, a simple summing circuit 152 (e.g., an adder), a second determination circuit 153, a same position correction circuit 154, a neighbor correction circuit 155, a maximum signal generator 156, a first multiplexer MUX1 and a second multiplexer MUX2. The same position correction circuit 154 may be configured to operate on digital signals of a pixel having a photoelectric conversion device that is saturated with light and digital signals of pixels that are located within the same group as the pixel. The neighbor correction circuit 155 may be configured to operate on digital signals of a pixel having a photoelectric conversion device that is saturated with light and digital signals of pixels that are located within a different group from the pixel.

The first determination circuit 151 can receive first line data (L_dD) and second line data (R_dD) to detect a pixel in which one photoelectric conversion device between a pair of photoelectric conversion devices included in each unit pixel outputs a saturation current. For example, the first determination circuit 151 can determine whether one of the two photodiodes in a given pixel has reached a saturation level while the other of the two photodiodes is at a level that is less than the saturation level.

For example, using 5×5 pixels or 7×7 pixels arranged in the Bayer pattern as illustrated in FIG. 5 as a detection region, the first determination circuit 151 can detect whether a saturation current of the first line data (L_dD) and the second line data (R_dD) corresponding to the detection region is output.

For example, in a case where a pixel is detected in which one photoelectric conversion device between a pair of photoelectric conversion devices included in each unit pixel of the detection unit outputs a saturation current, the first determination circuit 151 can output the first line data (L_dD) and the second line data (R_dD) that correspond to the pixels of the detection region to the second determination circuit 153, the same position correction circuit 154 and the neighbor correction circuit 155.

In a case where saturation currents being output from the pixels of the detection region are detected, the first determination circuit 151 can control a second selection signal SEL2 so that a correction signal (CPD_S), which is an output signal of the first multiplexer MUX1, is weighted to be output from the second multiplexer MUX2.

In a case where saturation currents being output from the pixels of the detection unit are not detected, the first determination circuit 151 can output the first line data (L_dD) and the second line data (R_dD) that correspond to the pixels of the detection region to the simple summing circuit 152.

In a case where saturation currents being output from the pixels of the detection unit are not detected, the first determination circuit 151 can control a second selection signal SEL2 so that an output signal (SIMPLE_S) of the simple summing circuit 152 is weighted to be output from the second multiplexer MUX2.

In a case where a pixel in which one photoelectric conversion device between a pair of photoelectric conversion devices included in each unit pixel of the detection region outputs a saturation current exists at least two pixels in the basic group, the first determination circuit 151 can output the second select signal SEL2 so that an output signal (Max_V) of the maximum signal generator 156 is weighted to be output from the second multiplexer MUX2. For example, if the basic group includes a first green pixel, a second green pixel, one red pixel, and one blue pixel, only one photodiode of the first green pixel is outputting a saturation current, only one photodiode of the second green pixel is outputting a saturation current, and none of the photodiodes of the blue and red pixels are outputting saturation currents, the first determination circuit 151 outputs the second select signal SEL so that Max_V is output from the second multiplexer MUX2.

In a case where saturation currents being output from the pixels of the detection unit are not detected, the simple summing circuit 152 can output a simple sum signal which is a sum of the first line data (L_dD) and the second line data (R_dD) that correspond to the pixels of the detection unit to the second multiplexer MUX2.

The second determination circuit 153 can receive the first line data (L_dD) and the second line data (R_dD) being output from the pixels of the detection region to determine a ratio of digital signals of adjacent pixels inside the basic group to which the detected pixels belong.

For brevity of description, it is assumed a case where saturation current is detected in the first type photo diode 1101*a* of the first pixel 1101 of FIG. 5. Also, it is assumed that the second type photo diode 1101*b* of the first pixel 1101 and the remaining pixels 1102, 1107 and 1108 in the first group (Group1) do not output saturation currents.

The second determination circuit 153 can determine whether a first type ratio (Ratio_RBa) of a digital signal value corresponding to the first type photo diode 1102*a* of the second pixel 1102 to a digital signal value corresponding to the first type photo diode 1107*a* of the seventh pixel 1107 coincides with a second type ratio (Ratio_RBb) of a digital signal value corresponding to the second type photo diode 1102*b* of the second pixel 1102 to a digital signal value corresponding to the second type photo diode 1107*b* of the seventh pixel 1107. For example, the first type ratio may be determined to coincide with the second type ratio when the two ratios are the same as one another or are within a certain threshold of one another. Also, the second determination circuit 153 may output a first select signal SEL1 to the first multiplexer MUX1 and the second multiplexer MUX2 depending on whether the first type ratio (Ratio_RB a) is coincident with the second type ratio (Ratio_RBb).

For example, in a case where the first type ratio (Ratio_RB a) is coincident with the second type ratio (Ratio_RBb), the second determination circuit 153 may output the first select signal SEL1 to the first multiplexer MUX1 so that an output signal of the same position correction circuit 154 among the output of the same position correction circuit 154 and the output of the neighbor correction circuit 155 is weighted to be reflected. In contrast, in a case where the first type ratio (Ratio_RBa) is not coincident with the second type ratio (Ratio_RBb), the second determination circuit 153 may output the first select signal SEL1 to the first multiplexer MUX1 so that an output signal of the neighbor correction circuit 155 among the output of the same position correction circuit 154 and the output of the neighbor correction circuit 155 is weighted to be reflected.

The second determination circuit 153 can control the degree of weighting of the correction signal (CPD_S) being output through the second multiplexer MUX2 by outputting the first select signal SEL1 to the second multiplexer MUX2.

The same position correction circuit 154 can correct a digital signal corresponding to a saturation current to output a same position correction signal using a digital signal corresponding to an output current of a photoelectric conversion device forming a pair with a photoelectric conversion device that outputs a saturation current included in a unit pixel detected by the first determination circuit 151.

A digital signal value corresponding to the first type photo diode 1101*a* of the first pixel 1101 is defined as a 1-1 digital signal (1101*a*_GD) and a digital signal value corresponding to the second type photo diode 1101*b* of the first pixel 1101 is defined as a 1-2 digital signal (1101*b*_GD). A digital signal value corresponding to the first type photo diode 1102*a* of the second pixel 1102 is defined as a 2-1 digital signal (1102*a*_RD) and a digital signal value corresponding to the second type photo diode 1102*b* of the second pixel 1102 is defined as a 2-2 digital signal (1102*b*_RD). A digital signal value corresponding to the first type photo diode 1107*a* of the seventh pixel 1107 is defined as a 7-1 digital signal (1107*a*_BD) and a digital signal value corresponding to the second type photo diode 1107*b* of the seventh pixel 1107 is defined as a 7-2 digital signal (1107*b*_BD). A digital signal value corresponding to the first type photo diode 1108*a* of the eighth pixel 1108 is defined as a 8-1 digital signal (1108*a*_GD) and a digital signal value corresponding to the second type photo diode 1108*b* of the eighth pixel 1108 is defined as a 8-2 digital signal (1108*b*_GD).

For brevity of description, it is assumed that a saturation current is detected in the first type photo diode 1101*a* of the first pixel 1101 of FIG. 5. Also, it is assumed that the second type photo diode 1101*b* of the first pixel 1101 and the remaining pixels 1102, 1107 and 1108 in the first group (Group1) do not output saturation currents.

In this case, the same position correction circuit 154 can calculate a ratio of the 1-2 digital signal (1101*b*_GD) to the 2-2 digital signal (1102*b*_RD) to correct the 1-1 digital signal (1101*a*_GD). The same position correction circuit 154 can also calculate a ratio of the 1-2 digital signal (1101*b*_GD) to the 7-2 digital signal (1107*b*_BD).

$$1101a\_GD1 = \frac{1101b\_GD}{1102b\_RD} \times 1102a\_RD \qquad \text{[mathematical formula 1]}$$

As illustrated in the mathematical formula 1, the same position correction circuit 154 can calculate a same position correction first signal (1101*a*_GD1) by multiplying a ratio of the 1-2 digital signal (1101*b*_GD) to the 2-2 digital signal (1102*b*_RD) by the 2-1 digital signal (1102*a*_RD).

$$1101a\_GD2 = \frac{1101b_{GD}}{1107b_{BD}} \times 1107a\_BD \qquad \text{[mathematical formula 2]}$$

As illustrated in the mathematical formula 2, the same position correction circuit 154 can calculate a same position correction second signal (1101*a*_GD2) by multiplying a ratio of the 1-2 digital signal (1101*b*_GD) to the 7-2 digital signal (1107*b*_BD) by the 7-1 digital signal (1107*a*_BD).

The same position correction circuit 154 can correct the 1-1 digital signal (1101*a*_GD) to a weighted average value of the same position correction first signal (1101*a*_GD1) and the same position correction second signal (1101*a*_GD2). In this example, the second pixel 1102 and pixel 1107 are chosen for the above calculation because they are adjacent to the pixel outputting the saturation current, i.e., the first pixel 1101.

In another case, it is assumed that saturation current is detected in the first type photo diode 1102*a* of the second pixel 1102 of FIG. 5. Also, it is assumed that the second type photo diode 1102*b* of the second pixel 1102 and the remaining pixels 1101, 1107 and 1108 of the first group (Group1) do not output saturation currents.

In this case, the same position correction circuit 154 can calculate an average value of the 1-1 digital signal (1101*a*_GD) and the 8-1 digital signal (1108*a*_GD) and an average value of the 1-2 digital signal (1101*b*_GD) and the 8-2 digital signal (1108*b*_GD). In this example, the first pixel 1101 and pixel 1108 are chosen for the above calculation because they are adjacent to the pixel outputting the saturation current, i.e., the second pixel 1102.

Thereafter, the same position correction circuit 154 can calculate a ratio of the 2-2 digital signal (1102*b*_RD) to the average value of the 1-2 digital signal (1101*b*_GD) and the 8-2 digital signal (1108*b*_GD). The same position correction circuit 154 can also calculate a ratio of the 2-2 digital signal (1102*b*_RD) to the 7-2 digital signal (1107*b*_BD).

$$1102\text{b\_RD1} = \frac{1102\text{b\_RD}}{\frac{1101\text{b\_GD} + 1108\text{b\_GD}}{2}} \times \frac{1101\text{a\_GD} + 1108\text{a\_GD}}{2} \quad \text{[mathematical formula 3]}$$

Subsequently, as illustrated in the mathematical formula 3, the same position correction circuit 154 can calculate a same position correction first signal (1102*b*_RD1) by multiplying a ratio of the 2-2 digital signal (1102*b*_RD) to the average value of the 1-2 digital signal (1101*b*_GD) and the 8-2 digital signal (1108*b*_GD) by the average value of the 1-1 digital signal (1101*a*_GD) and the 8-1 digital signal (1108*a*_GD).

$$1102\text{b\_RD2} = \frac{1102\text{b\_RD}}{1107\text{b\_BD}} \times 1107\text{a\_BD} \quad \text{[mathematical formula 4]}$$

As illustrated in the mathematical formula 4, the same position correction circuit 154 can calculate a same position correction second signal (1102*b*_RD2) by multiplying a ratio of the 2-2 digital signal (1102*b*_RD) to the 7-2 digital signal (1107*b*_BD) by the 7-1 digital signal (1107*a*_BD).

The same position correction circuit 154 can correct the 2-1 digital signal (1102*a*_RD) to a weighted average value of the same position correction first signal (1102*b*_RD1) and the same position correction second signal (1102*b*_RD2).

The neighbor correction circuit 155 can correct a digital signal corresponding to a saturation current to output a neighbor correction signal using a digital signal of a photoelectric conversion device disposed near a photoelectric conversion device that outputs a saturation current of a pixel detected from among photoelectric conversion devices in another basic group adjacent to a basic group to which a unit pixel detected by the first determination circuit 151 belongs.

A digital signal value corresponding to the first type photo diode 1101*a* of the first pixel 1101 is defined as a 1-1 digital signal (1101*a*_GD) and a digital signal value corresponding to the second type photo diode 1101*b* of the first pixel 1101 is defined as a 1-2 digital signal (1101*b*_GD). A digital signal value corresponding to the first type photo diode 1102*a* of the second pixel 1102 is defined as a 2-1 digital signal (1102*a*_RD) and a digital signal value corresponding to the second type photo diode 1102*b* of the second pixel 1102 is defined as a 2-2 digital signal (1102*b*_RD). A digital signal value corresponding to the first type photo diode 1107*a* of the seventh pixel 1107 is defined as a 7-1 digital signal (1107*a*_BD) and a digital signal value corresponding to the second type photo diode 1107*b* of the seventh pixel 1107 is defined as a 7-2 digital signal (1107*b*_BD). A digital signal value corresponding to the first type photo diode 1108*a* of the eighth pixel 1108 is defined as an 8-1 digital signal (1108*a*_GD) and a digital signal value corresponding to the second type photo diode 1108*b* of the eighth pixel 1108 is defined as an 8-2 digital signal (1108*b*_GD).

A digital signal value corresponding to the first type photo diode 1103*a* of the third pixel 1103 is defined as a 3-1 digital signal (1103*a*_GD) and a digital signal value corresponding to the second type photo diode 1103*b* of the third pixel 1103 is defined as a 3-2 digital signal (1103*b*_GD). A digital signal value corresponding to the first type photo diode 1104*a* of the fourth pixel 1104 is defined as a 4-1 digital signal (1104*a*_RD) and a digital signal value corresponding to the second type photo diode 1104*b* of the fourth pixel 1104 is defined as a 4-2 digital signal (1104*b*_RD). A digital signal value corresponding to the first type photo diode 1109*a* of the ninth pixel 1109 is defined as a 9-1 digital signal (1109*a*_BD) and a digital signal value corresponding to the second type photo diode 1109*b* of the ninth pixel 1109 is defined as a 9-2 digital signal (1109*b*_BD). A digital signal value corresponding to the first type photo diode 1110*a* of the tenth pixel 1110 is defined as a 10-1 digital signal (1110*a*_GD) and a digital signal value corresponding to the second type photo diode 1110*b* of the tenth pixel 1110 is defined as a 10-2 digital signal (1110*b*_GD).

A digital signal value corresponding to the first type photo diode 1113*a* of the thirteenth pixel 1113 is defined as a 13-1 digital signal (1113*a*_GD) and a digital signal value corresponding to the second type photo diode 1113*b* of the thirteenth pixel 1113 is defined as a 13-2 digital signal (1113*b*_GD). A digital signal value corresponding to the first type photo diode 1114*a* of the fourteenth pixel 1114 is defined as a 14-1 digital signal (1114*a*_RD) and a digital signal value corresponding to the second type photo diode 1114*b* of the fourteenth pixel 1114 is defined as a 14-2 digital signal (1114*b*_RD). A digital signal value corresponding to the first type photo diode 1119*a* of the nineteenth pixel 1119 is defined as a 19-1 digital signal (1119*a*_BD) and a digital signal value corresponding to the second type photo diode 1119*b* of the nineteenth pixel 1119 is defined as a 19-2 digital signal (1119*b*_BD). A digital signal value corresponding to the first type photo diode 1120*a* of the twentieth pixel 1120 is defined as a 20-1 digital signal (1120*a*_GD) and a digital signal value corresponding to the second type photo diode 1120*b* of the twentieth pixel 1120 is defined as a 20-2 digital signal (1120*b*_GD).

For brevity of description, it is assumed that a saturation current is detected in the first type photo diode 1101*a* of the first pixel 1101 of FIG. 5. Also, it is assumed that the second type photo diode 1101*b* of the first pixel 1101 and the remaining pixels 1102, 1107 and 1108 in the first group (Group1) do not output saturation currents. It is assumed that the pixels 1103, 1104, 1109 and 1110 of the second group (Group2) do not output saturation currents and at least one pixel among the pixels of the fourth group (Group4) outputs a saturation current.

In this case, the neighbor correction circuit 155 can perform a correction using another basic group formed of pixels that do not output saturation currents. For example, the neighbor correction circuit 155 can correct the 1-1 digital signal (1101*a*_GD) using the 3-1 digital signal (1103*a*_GD) which is a digital signal of the first type photodiode 1103*a* of the third pixel 1103 of the second group (Group2) arranged in a position corresponding to the 1-1 digital signal (1101*a*_GD).

The neighbor correction circuit 155 can perform a correction through an interpolation among other basic groups formed of pixels that do not output saturation currents. For example, the neighbor correction circuit 155 can correct the 1-1 digital signal (1101*a*_GD) by interpolating a 3-1 digital signal (1103*a*_GD) which is a digital signal of the first type photo diode 1103*a* of the third pixel 1103 of the second basic group (Group2) and a digital signal of the first type photo diode 1113*a* of the thirteenth pixel 1113 of the fourth basic group (Group4) that are arranged at a position that corresponds to the 1-1 digital signal (1101*a*_GD).

In another case, it is assumed that saturation current is detected in the first type photo diode 1101a of the first pixel 1101 of FIG. 5. It is assumed that the second type photo diode 1101b of the first pixel 1101 and the remaining pixels 1102, 1107 and 1108 of the first group (Group1) do not output saturation currents. Also, it is assumed that the pixels 1103, 1104, 1109 and 1110 of the second basic group (Group2) and the pixels 1113, 1114, 1119 and 1120 of the fourth basic group (Group4) do not output saturation currents.

Similarly, the neighbor correction circuit 155 can perform a correction using another basic group formed of pixels that do not output saturation currents. For example, the neighbor correction circuit 155 can correct the 1-1 digital signal (1101a_GD) using an average value of a 3-1 digital signal (1103a_GD) which is a digital signal of the first type photo diode 1103a of the third pixel 1103 of the second basic group (Group2) and a digital signal of the first type photo diode 1113a of the thirteenth pixel 1113 of the fourth basic group (Group4) that are arranged at a position that corresponds to the 1-1 digital signal (1101a_GD).

The first multiplexer MUX1 can output a compensation signal (CPD_S) based on an output signal of the same position correction circuit 154 and an output signal of the neighbor correction circuit 155 according to the first select signal SEL1.

For example, the compensation signal (CPD_S) may be a signal that corresponds to a weighted average of the output signal of the same position correction circuit 154 and the output signal of the neighbor correction circuit 155. For example, if an output period is 10 ms is used and the weights are the same, the second determination circuit 153 can output the first select signal SEL1 at a first level to the first multiplexer MUX1 to provide the output of the same position correction circuit 154 for the first 5 ms of the output period and output the first select signal SEL1 at a second level to the first multiplexer MUX1 to provide the output of the neighbor correction circuit 1 for the last 5 ms of the output period.

The second multiplexer MUX2 can output the correction signal (SUM_D) on the basis of the maximum signal (Max_V), the compensation signal (CPD_S) and the simple sum signal (SIMPLE_S) according to the first select signal SEL1 and the second select signal SEL2. In an embodiment, the maximum signal (Max_V) has a same level as the saturation level.

For example, the correction signal (SUM_D) may be a signal corresponding to a weighted average of the maximum signal (Max_V), the compensation signal (CPD_S) and the simple sum signal (SIMPLE_S). For example, the first select signal SEL1 and the second select signal SEL2 may be set to different combinations of levels so that one of the maximum signal (Max_V), the compensation signal (CPD_S) and the simple sum signal (SIMPLE_S) is output at a given time. For example, if each of the signals is to receive the same weight during a 9 ms output period, then the select signals could be set at levels that cause the second multiplexer MUX2 to output the maximum signal (Max_V) for a first 3 ms of the output period, output the compensation signal (CPD_S) for a second 3 ms of the output period, and output the simple sum signal (SIMPLE_S) for a last 3 ms of the output period.

Figure 8:
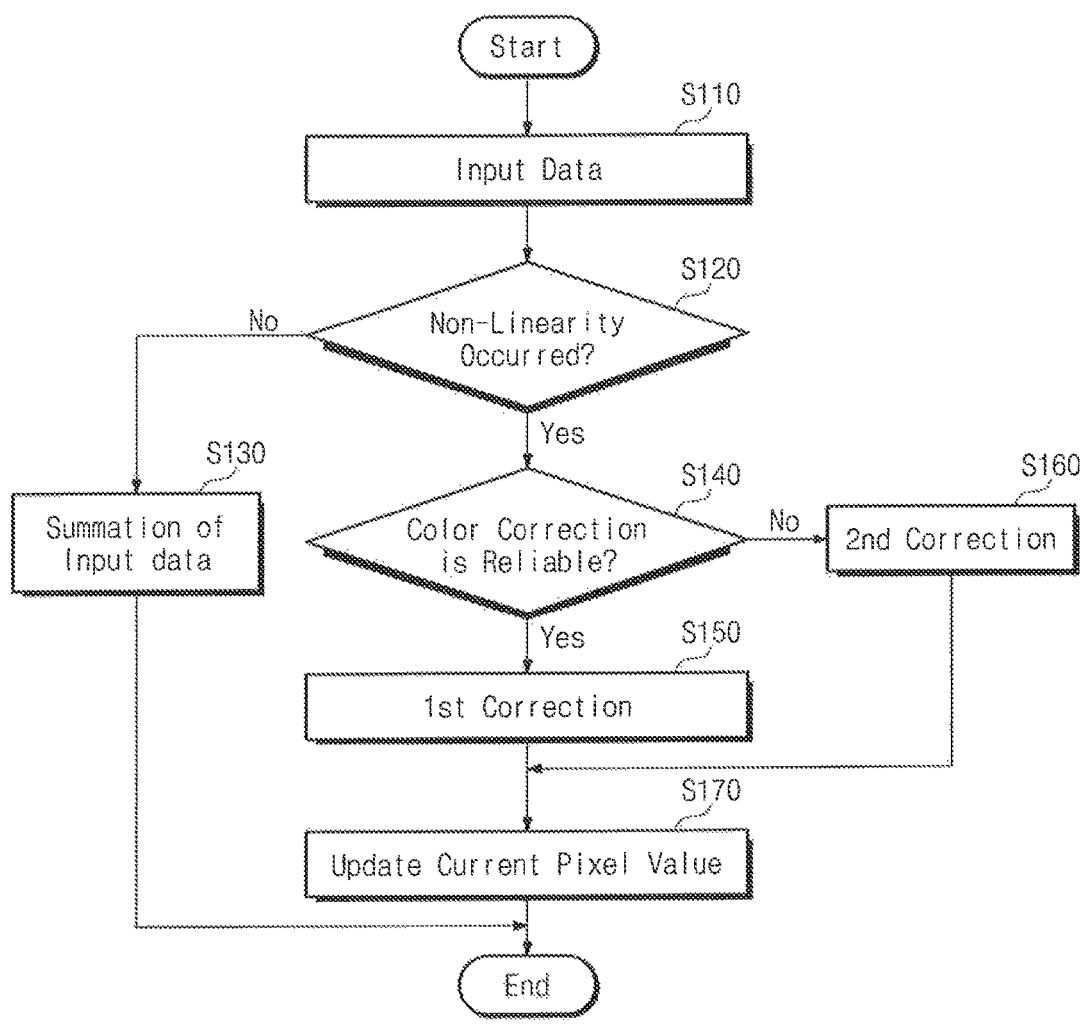
FIG. 8 is a flowchart of an image capturing method of an image capturing device in accordance with an exemplary embodiment of the inventive concept.

FIG. 8 is a flowchart of an image capturing method of an image capturing device 100 in accordance with an exemplary embodiment of the inventive concept.

Referring to FIGS. 1, 4, 7 and 8, in a step S110, the image capturing device 100 receives a pair of digital signals output from a pair of photoelectric conversion devices disposed inside a plurality of pixels of the image capturing device 100. For example, the pair of digital signals may be the first line data (L_dD) and the second line data (R_dD).

In a step S120, the image capturing device 100 determines whether nonlinearity occurs on the basis of the received first line data (L_dD) and the received second line data (R_dD). For example, the image capturing device 100 can detect a pixel through which a saturation current flows on the basis of the received first line data (L_dD) and the received second line data (R_dD). The image capturing device 100 can detect a pixel in which one photoelectric conversion device between a pair of photoelectric conversion devices included in each of the plurality of pixels outputs a saturation current.

In a case where a pixel that outputs a saturation current is not detected from between the pair of photoelectric conversion devices included in each of the plurality of pixels, in a step S130, the image capturing device 100 outputs the simple sum signal (SIMPLE_S) which is a sum of the received first line data (L_dD) and the received second line data (R_dD).

In a case where a pixel that outputs a saturation current is detected from between the pair of photoelectric conversion devices included in each of the plurality of pixels, in a step S140, the image capturing device 100 determines whether color correction is reliable. In an embodiment, the image capturing device 100 determines whether color correction is reliable by determining whether ratios of digital signals which correspond to respective currents being output from a pair of photoelectric conversion devices of adjacent pixels in a basic group to which the detected pixel belong coincides with each other.

In a step S150, in a case where ratios of digital signals which correspond to respective currents being output from a pair of photoelectric conversion devices of adjacent pixels in a basic group to which the detected pixel belong coincides with each other, the image capturing device 100 performs a first correction using a digital signal of an output current of a photoelectric conversion device forming a pair with a photoelectric conversion device that outputs a saturation current of the detected pixel. In a step S170, the image capturing device 100 updates a digital signal corresponding to the saturation current of the detected pixel with a digital signal obtained through the first correction.

For example, if a pixel within a current group is outputting a saturation current and adjacent pixels within the same current group are not outputting a saturation current, it is possible to generate the first correction, and thus color correction using pixels within the same basic group is reliable. However, if the adjacent pixels of the current group are also outputting a saturation current, it is not possible to generate the first correction, and thus color correction using pixels within the same current group is not reliable.

In a step S160, in a case where ratios of digital signals which correspond to respective currents being output from a pair of photoelectric conversion devices of adjacent pixels in a basic group to which the detected pixel belong do not coincide with each other, the image capturing device 100 performs a second correction using a digital signal value of a photoelectric conversion device arranged at a position corresponding to a photoelectric capturing device that outputs a saturation current of the detected pixel among photoelectric conversion devices in another basic group adjacent to a basic group to which the detected pixel belongs. Thereafter, in the step S170, the image capturing device 100 updates a digital signal corresponding to the saturation current of the detected pixel with a digital signal obtained through the second correction.

For example, when color correction for a pixel of a current group detected to be outputting a saturation current is not reliable using adjacent pixels of the current group, the pixels of the groups adjacent to the current group may be used to perform the second correction.

Figure 9:
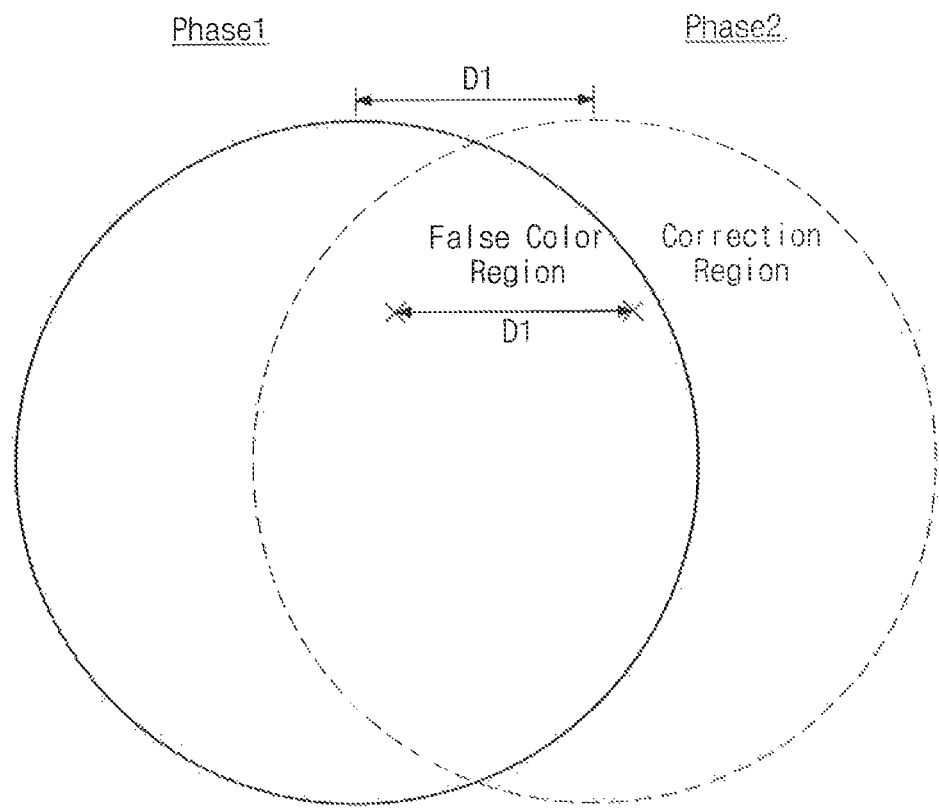
FIG. 9 illustrates a conceptual diagram of a disparity in accordance with an exemplary embodiment of the inventive concept.

FIG. 9 illustrates a conceptual diagram of a disparity in accordance with an exemplary embodiment of the inventive concept. The disparity of FIG. 9 is caused by a physical characteristic of using a pair of photoelectric conversion devices corresponding to one pixel. According to the inventive concept, a pair of diodes included in each of unit pixels is arranged in a unit pixel with space between them. Due to a space difference, a phase of FIG. 9 may be divided into two to be seen.

Referring to FIGS. 1, 3 and 9, a phase corresponding to output signals of the first type photo diodes (1101a-1130a) of each of unit pixels of the multi pixel array 110 may be a first phase (Phase1) represented by a solid line. Also, a phase corresponding to output signals of the second type photo diodes (1101b-1130b) of each of unit pixels of the multi pixel array 110 may be a second phase (Phase2) represented by a dotted line.

The image capturing device 100 of the inventive concept can generate a disparity corrected image by performing a block matching in the manner of reflecting a difference between the first phase (Phase1) and the second phase (Phase2).

A method in which the image capturing device 100 reflects disparity to perform the step S140 and the step S150 of FIG. 8 is described with reference to FIGS. 1, 3, 5, 7, 8 and 9. That is, in the case of reflecting a disparity, the step S110, the step S120, the step S130, the step S160 and the step S170 of FIG. 8 may be performed to be the same as contents described in FIG. 8.

For brevity of description, it is assumed that a phase corresponding to the first line data (L_dD) is the first phase (Phase1) represented by a solid line of FIG. 9 and a phase corresponding to the second line data (R_dD) is the second phase (Phase2) represented by a dotted line of FIG. 9.

As described above, the image capturing device 100 may determine a disparity value by performing a block matching for obtaining a difference of the first phase (Phase1) and the second phase (Phase2).

Referring to FIGS. 5 and 9, it is assumed that a false color region in which a false color of the first phase (Phase1) occurs corresponds to the first line data (L_dD) of the first group (Group1) and a correction region corresponds to the second line data (R_dD) of the first group (Group1).

For example, the first line data (L_dD) of the first group (Group1) may be the 1-1 digital signal (1101a_GD), the 2-1 digital signal (1102a_RD), the 7-1 digital signal (1107a_BD) and the 8-1 digital signal (1108a_GD). The second line data (R_dD) of the first group (Group1) may be the 1-2 digital signal (1101b_GD), the 2-2 digital signal (1102b_RD), the 7-2 digital signal (1107b_BD) and the 8-2 digital signal (1108b_GD). It is also assumed that the correction region in which the disparity value D1 determined by the image capturing device 100 is reflected corresponds to the second line data (R_dD) of the second group (Group2). For example, the second line data (R_dD) of the second group (Group2) may be the 3-2 digital signal (1103b_GD), the 4-2 digital signal (1104b_RD), the 9-2 digital signal (1109b_BD) and the 10-2 digital signal (1110b_GD).

It is assumed that saturation current is detected in the first type photo diode 1101a of the first pixel 1101. It is also assumed that the second type photo diode 1101b of the first pixel 1101 and the remaining pixels 1102, 1107 and 1108 of the first group (Group1) do not output saturation currents. It is assumed that the pixels 1103, 1104, 1109 and 1110 of the second group (Group2) do not output saturation currents.

In the case of the step S140 in which disparity is reflected, the second determination circuit 152 can determine whether a first type ratio (Ratio_RB a) of a digital signal value corresponding to the first type photo diode 1102a of the second pixel 1102 to a digital signal value corresponding to the first type photo diode 1107a of the seventh pixel 1107 coincides with a second type ratio (Ratio_RBb) of a digital signal value corresponding to the second type photo diode 1104b of the fourth pixel 1104 in which disparity is reflected to a digital signal value corresponding to the second type photo diode 1109b of the ninth pixel 1109 in which disparity is reflected. Also, the second determination circuit 153 may output the first select signal SEL1 to the first multiplexer MUX1 and the second multiplexer MUX2 depending on whether the first type ratio (Ratio_RBa) is coincident with the second type ratio (Ratio_RBb).

In the case of the step S150 in which disparity is reflected, to correct the 1-1 digital signal (1101a_GD), the same position correction circuit 154 may calculate a ratio of the 3-2 digital signal (1103b_GD) to the 4-2 digital signal (1104b_RD). Also, to correct the 1-1 digital signal (1101a_GD), the same position correction circuit 154 may calculate a ratio of the 3-2 digital signal (1103b_GD) to the 9-2 digital signal (1109b_BD).

$$1103\text{b\_GD1} = \frac{1103\text{b\_GD}}{1104\text{b\_RD}} \times 1104\text{a\_RD} \qquad \text{[mathematical formula 5]}$$

As illustrated in the mathematical formula 5, the same position correction circuit 154 may calculate a same position correction first signal (1103b_GD1) by multiplying a ratio of the 3-2 digital signal (1103b_GD) to the 4-2 digital signal (1104b_RD) by the 4-1 digital signal (1104a_RD).

$$1103\text{b\_GD2} = \frac{1103\text{b\_GD}}{1109\text{b\_BD}} \times 1109\text{a\_BD} \qquad \text{[mathematical formula 6]}$$

As illustrated in the mathematical formula 6, the same position correction circuit 154 may calculate a same position correction second signal (1103b_GD2) by multiplying a ratio of the 3-2 digital signal (1103b_GD) to the 9-2 digital signal (1109b_BD) by the 9-1 digital signal (1109a_BD).

The same position correction circuit 154 can correct the 1-1 digital signal (1101a_GD) to a weighted average value of the same position correction first signal (1103b_GD1) and the same position correction second signal (1103a_GD2).

Figure 10:
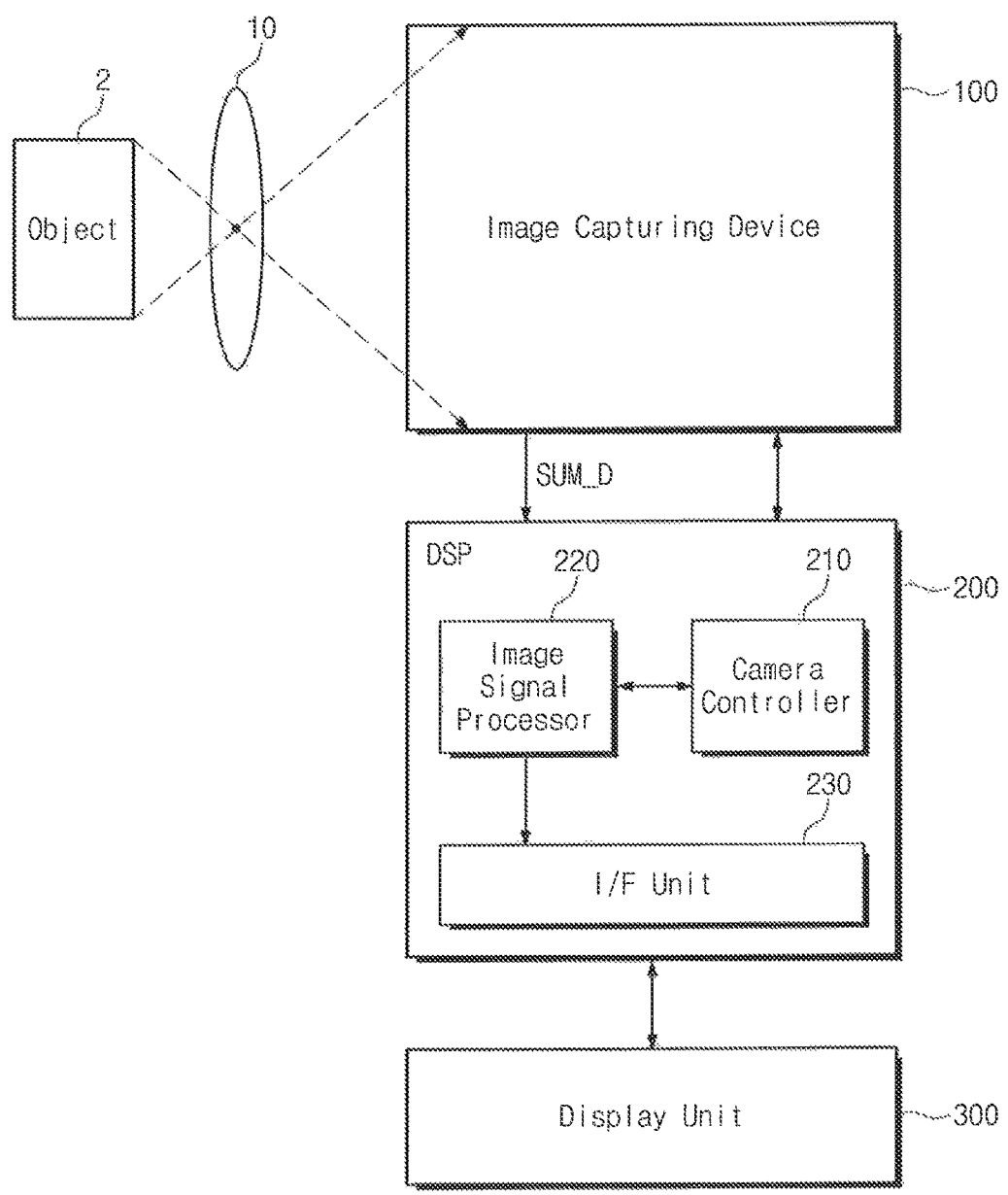
FIG. 10 is a block diagram of a camera to which the inventive concept is applied.

FIG. 10 is a block diagram of a camera to which the inventive concept is applied.

Referring to FIG. 10, a camera includes an image capturing device 100 having a false color cancelation (FCC) circuit, a DSP (digital signal processor) 200 and a display unit 300.

The image capturing device 100 senses an object 2 through a lens 10 under the control of the DSP 200. The DSP 200 can process image signals sensed by the image sensor 100 and output the processed image signals to the display unit 300.

The DSP 200 includes a camera controller 210, an image signal processor (ISP) 220, and an interface unit 230. The DSP 200 may further include a memory.

The display unit 300 includes all devices capable of outputting or displaying image signals. For instance, the display unit 300 may mean a computer, a mobile communication device, and an image output terminal. The display unit 300 may be a liquid crystal device having a backlight, a liquid crystal device having a light emitting diode (LED) light source or an organic LED (OLED) device and may have a touch screen.

According to the arrangement of FIG. 10, since the image capturing device 100 having a false color cancellation function is included in the camera, image accuracy of the camera may increase.

Figure 11:
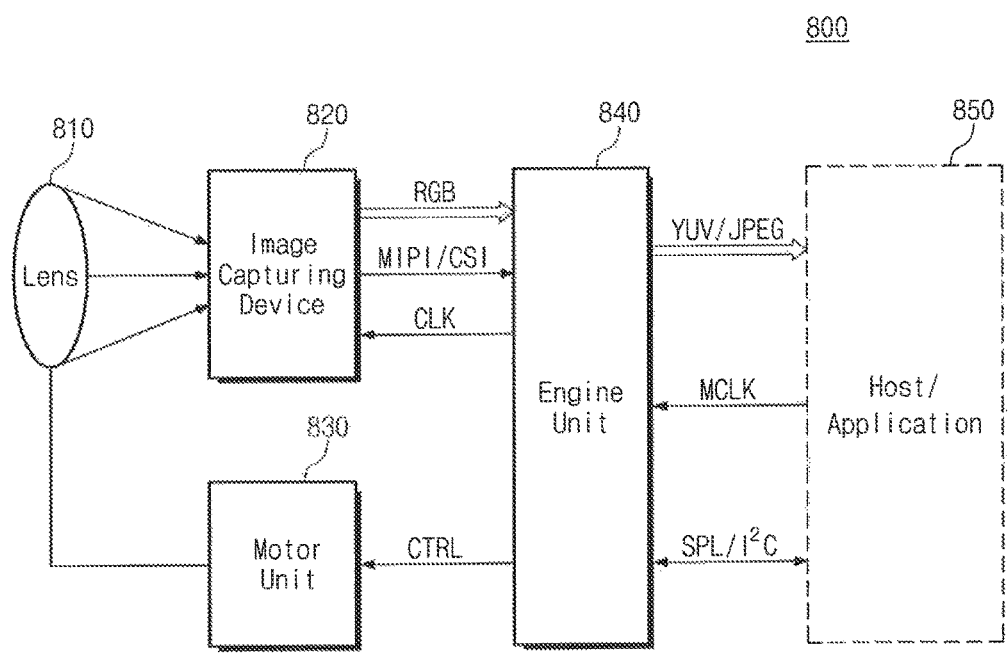
FIG. 11 illustrates an example of the inventive concept being applied to a digital camera.

FIG. 11 illustrates an embodiment of the inventive concept applied to a digital camera.

Referring to FIG. 11, a digital camera 800 like a digital single-lens reflex camera DSLR includes a lens 810, an image capturing device 820, a motor unit 830 (e.g., a motor), and an engine unit 840 (e.g., a processor).

The lens 810 concentrates incident light into a light receiving area of the image capturing device 820. The image capturing device 820 can generate RGB data of a Bayer pattern on the basis of the light that has entered through the lens 810. The image capturing device 820 may provide RGB data based on a clock signal CLK.

The image capturing device 820 can interface with the engine unit 840 through a mobile industry processor interface (MIPI) or a camera serial interface (CSI). The motor unit 830 may control a focus of the lens 810 or perform a shuttering in response to the control signal CTRL received from the engine unit 840. For example, the motor unit 830 may adjust a physical shutter of the digital camera that controls the amount of light entering through the lens 810. The engine unit 840 controls the image sensor 820 and the motor unit 830. On the basis of RGB data received from the image capturing device 820, the engine unit 840 may generate YUV data including a luminance component, a difference between the luminance component and a blue color component and a difference between the luminance component and a red color component, or generate compressed data, for example, joint photography expert group (JPEG) data.

The engine unit 840 may be connected to a host/application 850, and the engine unit 840 may provide the YUV data or the JPEG data to the host/application 850 on the basis of a master clock MCLK. The engine unit 840 may interface with the host/application 850 through a serial peripheral interface (SPI) or an inter integrated circuit (I²C).

According to an arrangement of the camera of FIG. 11, since the image capturing device 820 having a false color cancellation function is included in the camera, image accuracy of the camera may increase.

Figure 12:
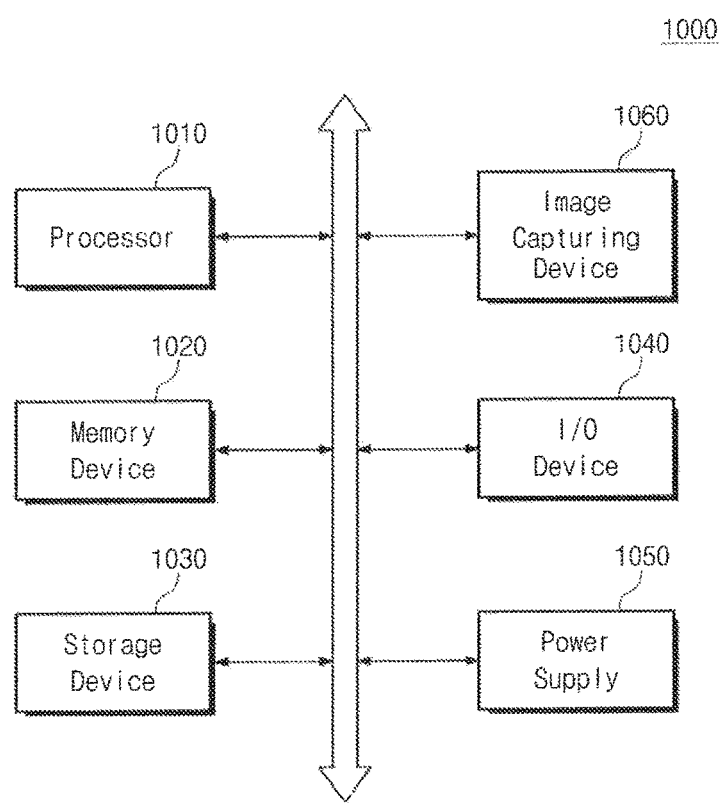
FIG. 12 illustrates an application of the inventive concept being applied to a computing system.

FIG. 12 illustrates an embodiment of the inventive concept applied to a computing system. Referring to FIG. 12, a computing system 1000 includes a processor 1010, a memory device 1020, a storage device 1030, an input/output (I/O) device 1040, a power supply 1050 and an image capturing device 1060.

The image capturing device 1060 performs a function of a false color cancellation (FCC). Although not illustrated in FIG. 12, the computing system 1000 may communicate with a video card, a sound card, a memory card, a universal serial bus (USB) device, etc. or may further include a port capable of communicating with other electronic devices.

The processor 1010 may perform specific calculations or specific tasks. The processor 1010 may be a micro processor, or a central processing unit (CPU).

The processor 1010 can communicate with the memory device 1020, the storage device 1030 and the I/O device 1040 through an address bus, a control bus and a data bus.

The processor 1010 may be connected to an expansion bus like a peripheral component interconnect (PCI) bus.

The memory device 1020 can store data needed in an operation of the computing system 1000. For example, the memory device 1020 may be implemented by a dynamic random access memory (DRAM), a mobile DRAM, a static RAM (SRAM), or a nonvolatile memory device.

The nonvolatile memory may be embodied by an electrically erasable programmable read-only memory (EEPROM), a flash memory, a conductive bridging RAM (CBRAM), a ferroelectric RAM (FeRAM), a phase change RAM (PRAM) which is called an ovonic unified memory (OUM), a resistive RAM (RRAM), a nanotube RRAM, a polymer RAM (PoRAM), a nanotube floating gate memory (NFGM), a holographic memory, a molecular electronics memory device, or an insulator resistance change memory.

The memory chips may be mounted respectively or together using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

The storage device 1030 may include a solid state drive (SSD), a hard disk drive (HDD), a CD-ROM, etc.

The I/O device 1040 may include an input means such as a keyboard, a keypad, a mouse, etc. and an output units such as a printer, a display, etc. The power supply 1050 may supply an operation voltage needed in an operation of the electronic device 1000.

The image capturing device 1060 may be connected to the processor 1010 through buses or other communication links to perform a communication. As described above, the image sensor 1060 can generate high definition image data having a high accuracy by performing a correction operation using an output signal of a pair of photo diodes to cancel a false color. The image capturing device 1060 may be integrated in one chip together with the processor 1010, or the image capturing device 1060 and the processor 1010 may be integrated in different chips respectively.

The computing system 1000 should be understood as all computing systems that use an image capturing device. For example, the computing system 1000 may include a digital camera, a mobile phone, a personal digital assistant (PDA), a portable multimedia player (PMP), a smart phone, a tablet PC, etc.

Figure 13:
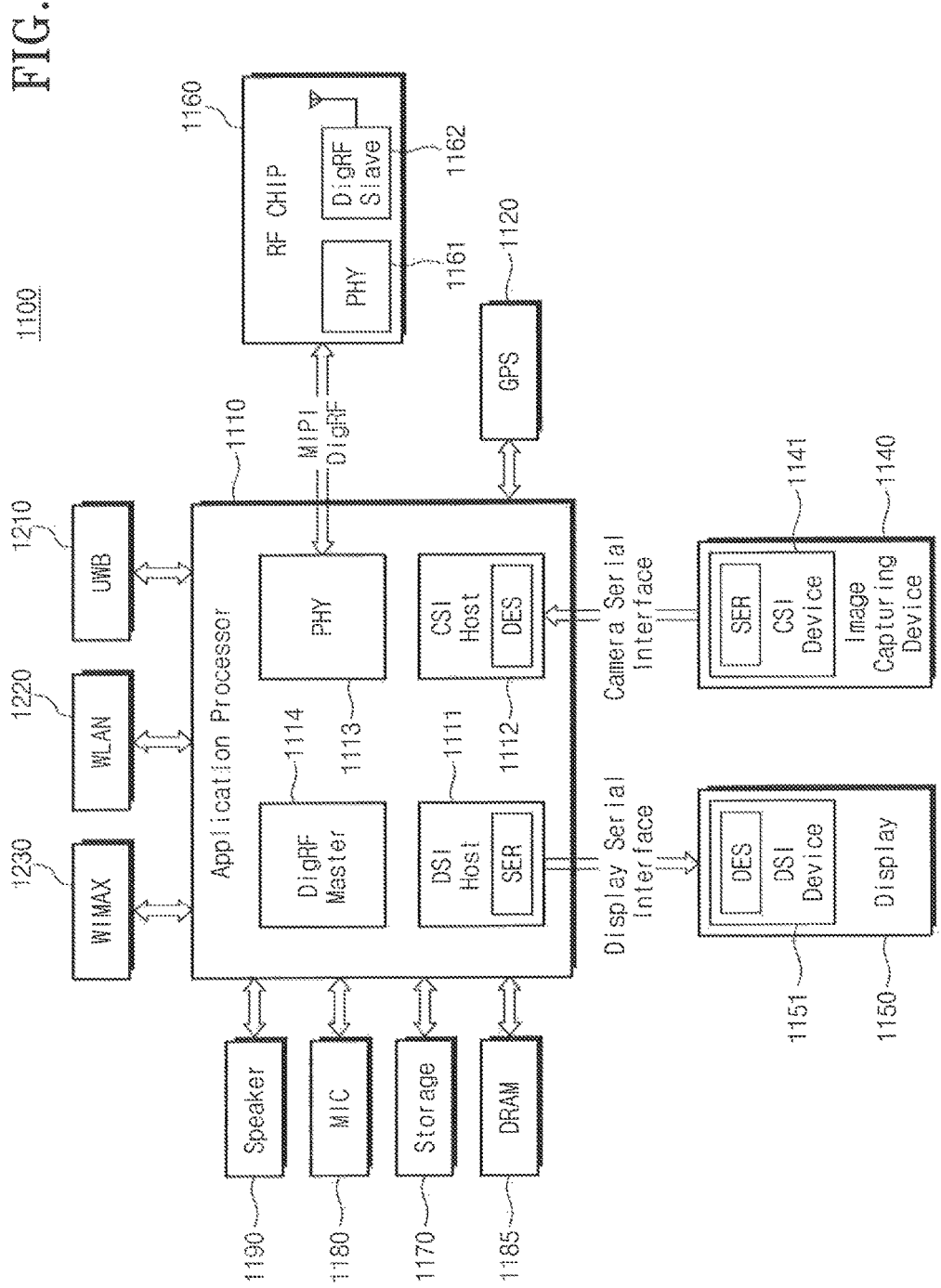
FIG. 13 illustrates an example of the inventive concept being applied to a cellular phone.

FIG. 13 illustrates an embodiment of the inventive concept applied to a cellular phone.

Referring to FIG. 13, the cellular phone 1100 may be embodied by a data processing device capable of using or supporting a MIPI interface and may include an application processor 1110, an image capturing device 1140 and a display 1150.

A CSI host 1112 of the application processor 1110 can perform a serial communication with a CSI device 1141 of the image capturing device 1140 through a CSI (camera serial interface).

The CSI host 1112 may include a deserializer (DES) and the CSI device 1141 may include a serializer (SER). A DSI host 1111 of the application processor 1110 can perform a serial communication with a DSI device 1151 of the display 1150 through a DSI (display serial interface).

The DSI host 1111 may include a serializer (SER) and the DSI device 1151 may include a deserializer (DES). Further, the cellular phone 1100 may further include a radio frequency (RF) chip 1160 that can perform a communication with the application processor 1110. A PHY 1113 of the cellular phone 1100 and a PHY 1161 of the RF chip 1160 may perform a data transmission/reception according to a MIPI DigRF.

The application processor 1110 may further include a DigRF MASTER 1114 that controls the data transmission/reception according to the MIPI DigRF of the PHY 1161. The cellular phone 1100 may include a global positioning system (GPS) 1120, a storage device 1170, a microphone 1180, a DRAM, and a speaker 1190.

The cellular phone 1100 can perform a communication using an UWB ultra wideband (UWB) 1210, a wireless local area network (WLAN) 1220 and a worldwide interoperability for microwave access (WIMAX) 1230, etc. A structure and an interface of the cellular phone 1100 is one embodiment of the inventive concept. However, the structure and interface of the cellular phone 1100 is not limited thereto.

In FIG. 13, since the image capturing device 1140 has a function of correcting nonlinearity due to a difference of light receiving amounts between a pair of photo diodes to cancel a false color, image accuracy of a camera in a cellular phone system may increase.

FIGS. 14 through 18 illustrate embodiments of a multimedia device to which an image capturing device in accordance with exemplary embodiments of the inventive concept is applied.

Figure 14:
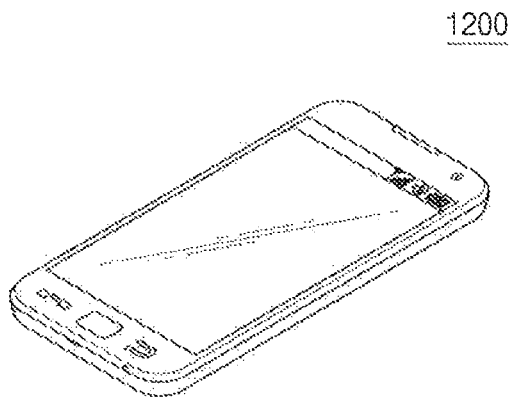
FIGS. 14 through 18 illustrate exemplary embodiments of a multimedia device to which an image capturing device in accordance with an exemplary embodiment of the inventive concept is applied.
Figure 15:
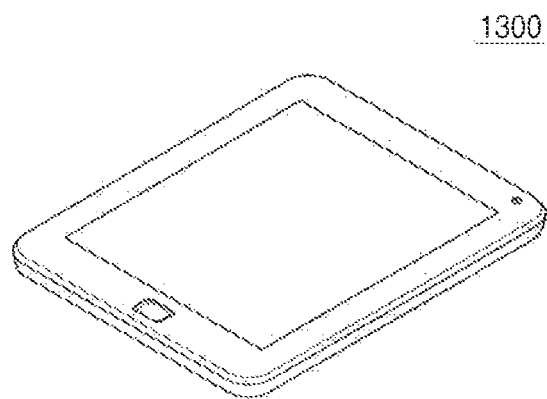
Figure 16:
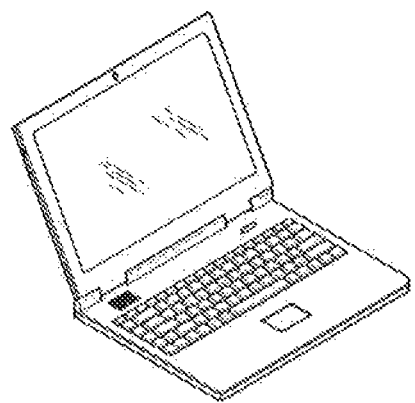
Figure 17:
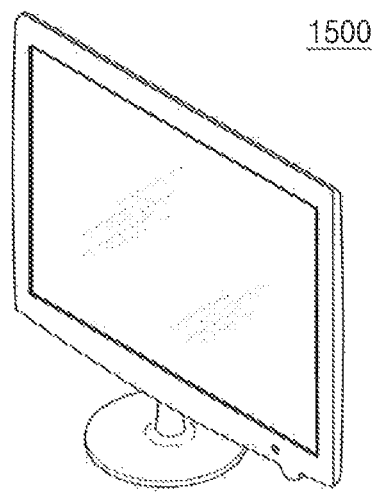
Figure 18:
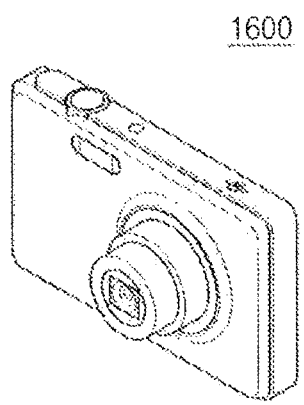

FIGS. 14 through 18 illustrate examples of a multimedia device to which the image capturing device in accordance with embodiments of the inventive concept is applied. The image capturing device may be applied to various multimedia devices including an image shooting or capturing function. For example, as illustrated in FIG. 14, the image capturing device may be applied to a mobile phone or a smart phone 1200. As illustrated in FIG. 15, the image capturing device may be applied to a tablet or a smart tablet 1300. As illustrated in FIG. 16, the image capturing device may be applied to a notebook computer 1400. As illustrated in FIG. 17, the image capturing device may be applied to a television or a smart television 1500. As illustrated in FIG. 18, the image capturing device may be applied to a digital camera or a digital camcorder 1600.

According to an exemplary embodiment of the inventive concept, a false color that occurs due to a difference of light receiving amounts of a plurality of photo diodes that constitute a plurality of pixels may be cancelled. Thus, an image capturing device having improved accuracy may be realized. Although a few exemplary embodiments of the inventive concept have been described, those skilled in the art will readily appreciate that many modifications are possible in the exemplary embodiments without materially departing from the present invention.

What is claimed is:
1. An image capturing device comprising:
   a pixel array comprising a plurality of pixels arranged in a matrix form, wherein each of the pixels comprises a pair of photoelectric conversion devices;
   an analog to digital converter that converts a pair of pixel signals corresponding to charges accumulated in the pair of photoelectric conversion devices included in each of the pixels into a pair of digital signals; and
   a circuit receiving the pair of digital signals being output from each of the pixels, detecting a pixel of a first group of the pixels including a first photoelectric conversion device outputting a saturation current based on the received pairs, calculating a ratio of digital signals of adjacent pixels in the first group, determining, based on the ratio, whether to correct a digital signal corresponding to the first photoelectric conversion device based on a second group adjacent to the first group, and correcting the digital signal corresponding to the first photoelectric conversion device based on a result of the determining.

2. The image capturing device of claim 1, wherein the circuit comprises:
   a first circuit that detects the pixel including the first photoelectric conversion device outputting the saturation current to output a first select signal;
   a second circuit that outputs a second select signal according to the ratio of the digital signals of the adjacent pixels in the first group to which the detected pixel belongs;
   a third circuit that corrects the digital signal corresponding to the saturation current using a digital signal of an output current of a photoelectric conversion device making a pair with the first photoelectric conversion device outputting the saturation current to output a first correction signal; and
   a fourth circuit that corrects the digital signal corresponding to the saturation current using a digital signal of a photoelectric conversion device of a position in the second group corresponding to the position of a photoelectric conversion device outputting the saturation current in the first group, to output a second correction signal.

3. The image capturing device of claim 2, wherein the second group is comprised of pixels that do not output the saturation current.

4. The image capturing device of claim 2, further comprising a first multiplexer that outputs a compensation signal based on the first correction signal and the second correction signal according to the second select signal.

5. The image capturing device of claim 4, further comprising a summing circuit that outputs a sum signal which is a sum of the pair of digital signals being outputted from the plurality of pixels.

6. The image capturing device of claim 5, further comprising a second multiplexer that outputs a correction signal based on the compensation signal and the sum signal according to the first select signal and the second select signal.

7. The image capturing device of claim 6, further comprising a signal generator outputting a maximum signal to the second multiplexer.

8. The image capturing device of claim 1, wherein the first group comprises two green pixels, one red pixel and one blue pixel.

9. The image capturing device of claim 2, wherein the second circuit determines a disparity through block matching using a difference between the pair of digital signals.

10. The image capturing device of claim 9, wherein the second select signal and the first correction signal are signals in which the disparity determined by the second circuit is reflected.

11. The image capturing device of claim 1, further comprising a filter receiving the pair of digital signals to cancel a noise that occurs in an analog to digital conversion performed by the analog to digital converter.

12. The image capturing device of claim 1, wherein the analog to digital converter further comprises a buffer storing the pair of digital signals converted in the analog to digital converter.

13. The image capturing device of claim 12, wherein the analog to digital converter sequentially outputs the pair of digital signals stored in the buffer according to an output signal of a timing generator.

14. An image capturing method of an image capturing device comprising a plurality of pixels including at least a first group, the method comprising:

- detecting a pixel in the first group through which a saturation current flows from a pair of digital signals output from a pair of photoelectric conversion devices disposed in each of a plurality of the pixels;
- determining a first ratio of a digital signal output by a first photoelectric conversion device of a first pixel adjacent the detected pixel in the first group to a digital signal output by a first photoelectric conversion device of a second pixel in the first group adjacent the detected pixel;
- determining a second ratio of a digital signal output by a second photoelectric conversion device of the first pixel to a digital signal output by a second photoelectric conversion device of the second pixel;
- performing a first correction using a digital signal of a photoelectric conversion device disposed within the detected pixel that is part of the pair comprising a photoelectric conversion device outputting the saturation current when a similarity between the first ratio and the second ratio is greater than a certain value; and
- compensating a digital signal of the saturation current of the detected pixel using the first correction.

15. The image capturing method of claim 14, further comprising performing a second correction using a digital signal of a photoelectric conversion device of a pixel in a second group of the pixels adjacent to the first group when the similarity is smaller than the value.

* * * * *